INVENTORS,
GEORGE T. JUDSON
EMIL J. FREIREICH
BY Jacobi & Davidson
ATTORNEYS

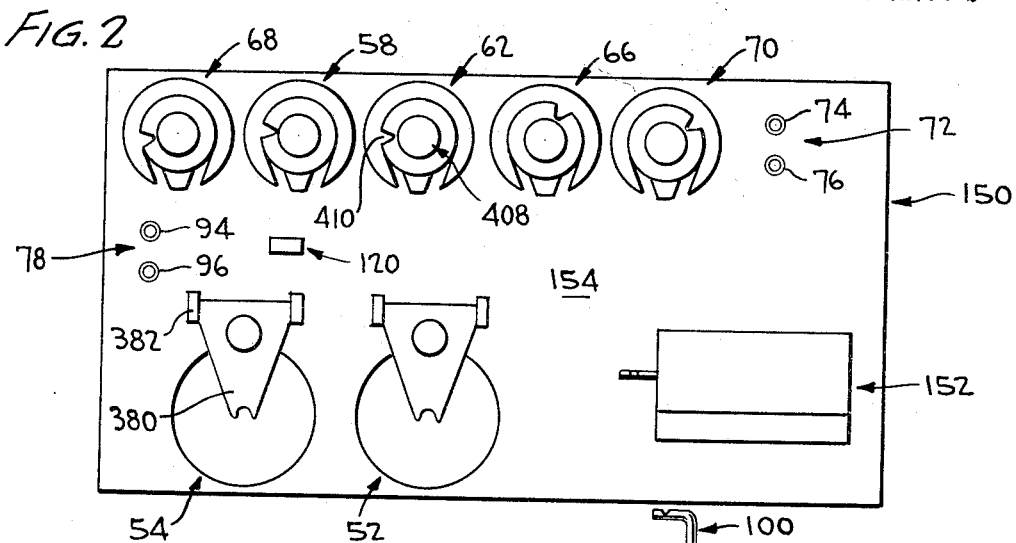
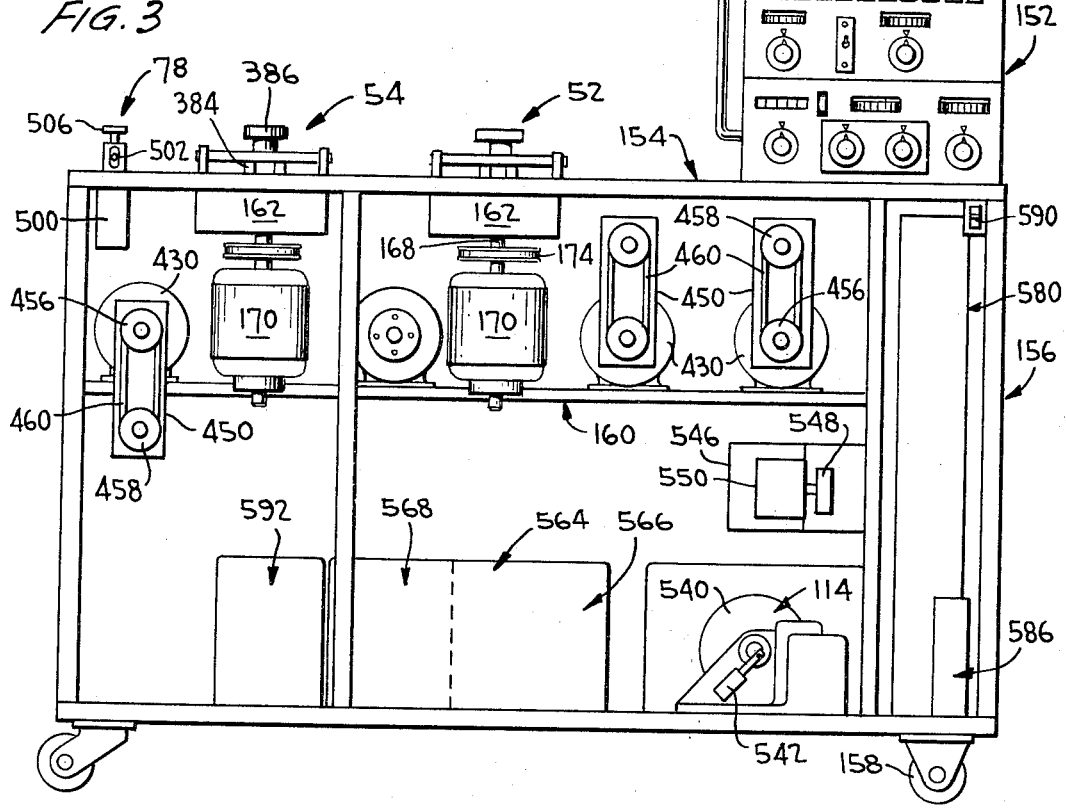

INVENTORS,
GEORGE T. JUDSON
EMIL J. FREIREICH

BY Jacobi & Davidson
ATTORNEYS

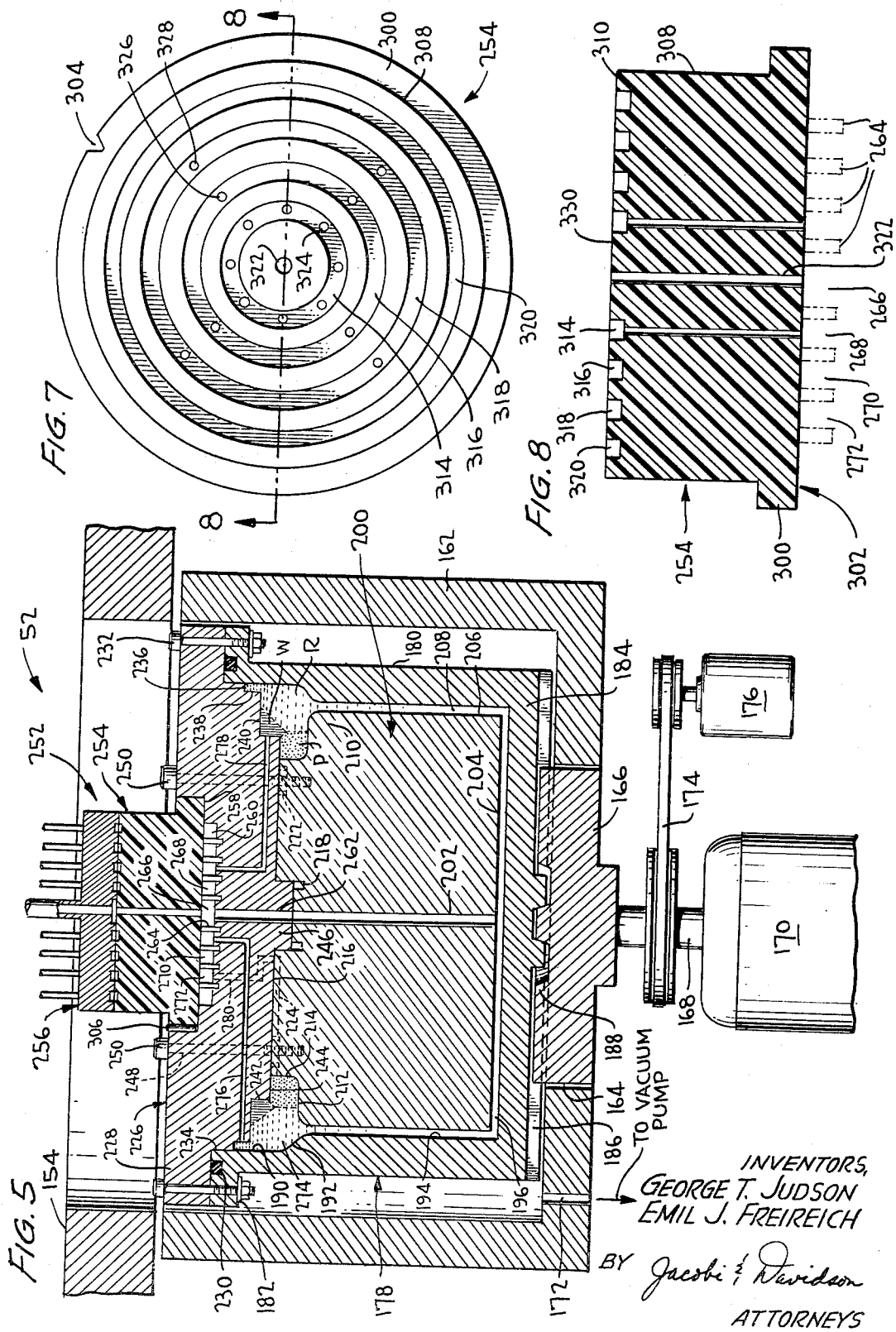

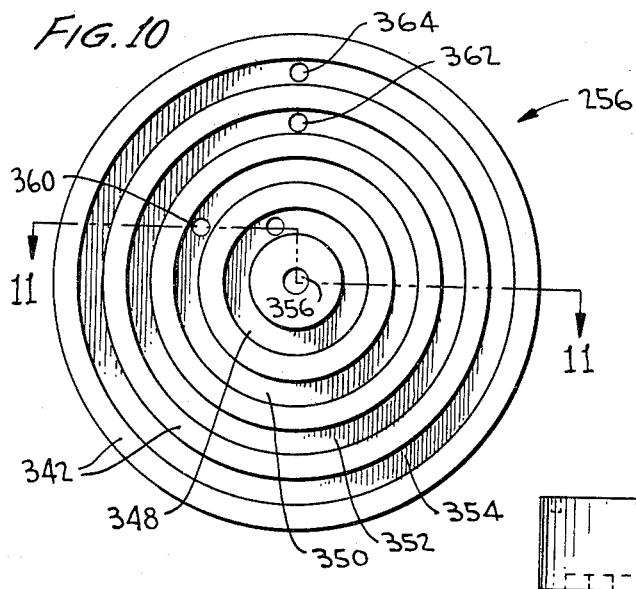
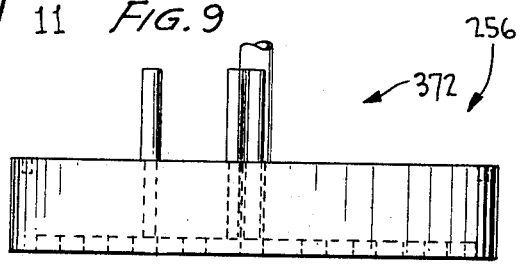
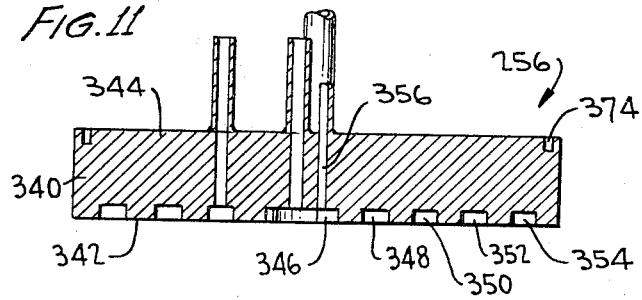
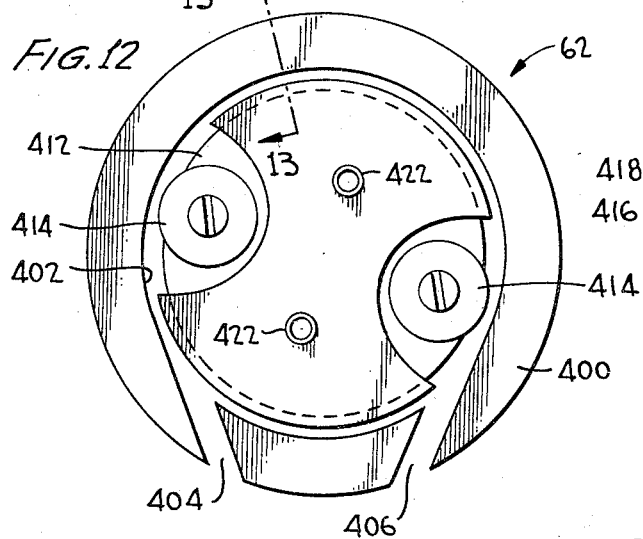
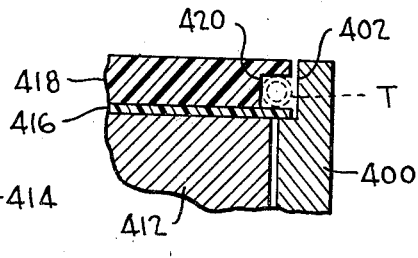
INVENTORS,
GEORGE T. JUDSON
EMIL J. FREIREICH
BY Jacobi & Davidson
ATTORNEYS

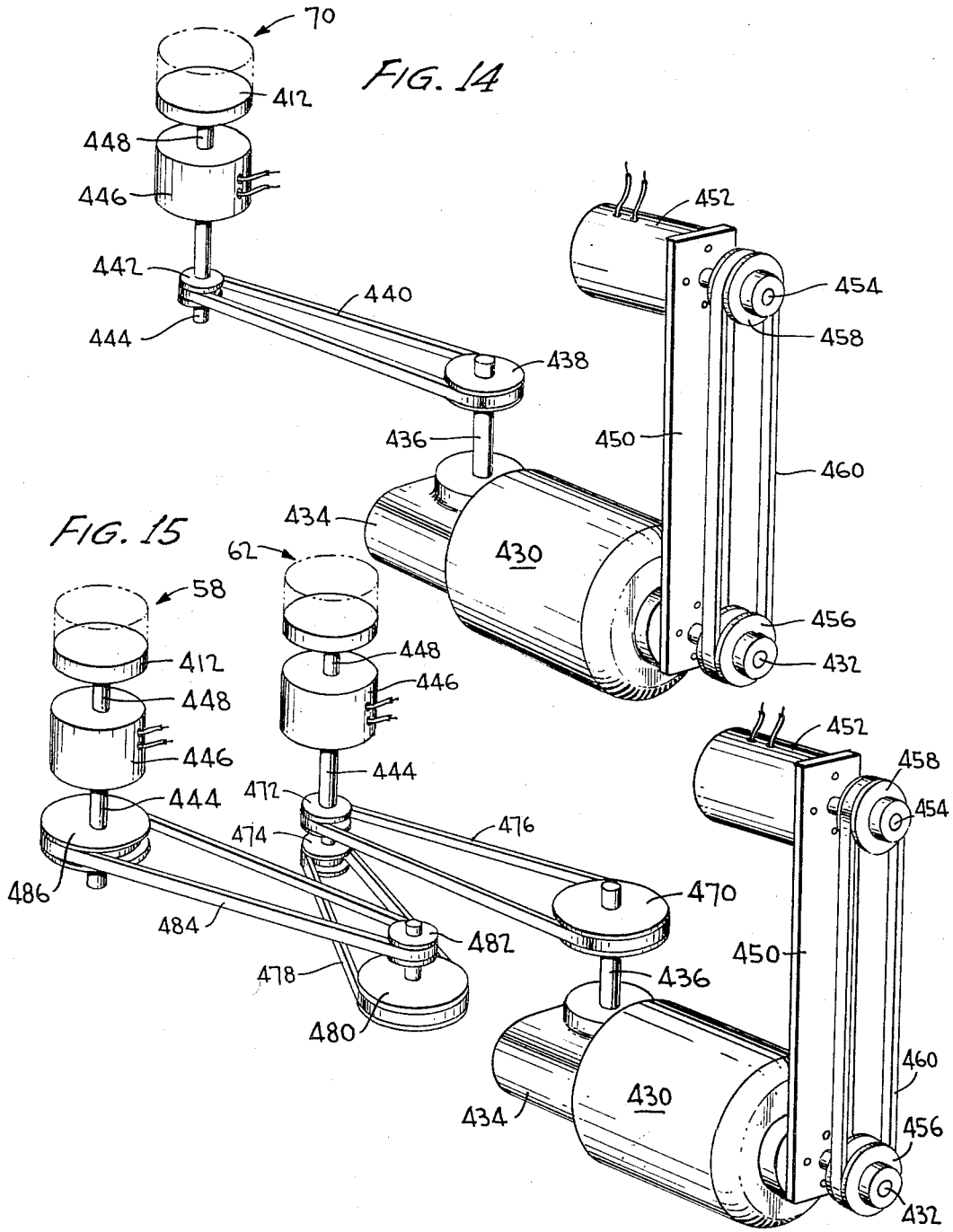

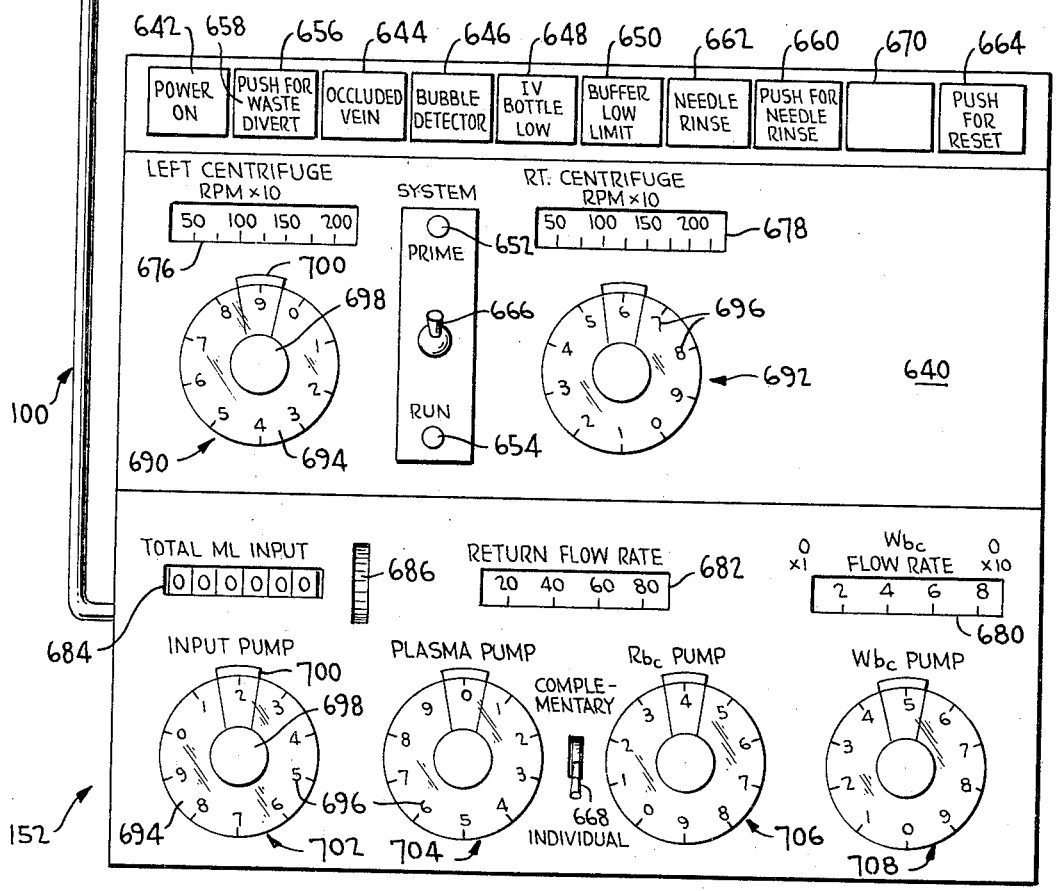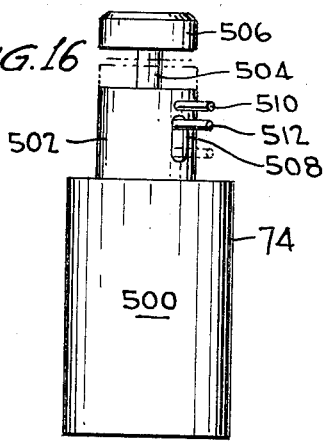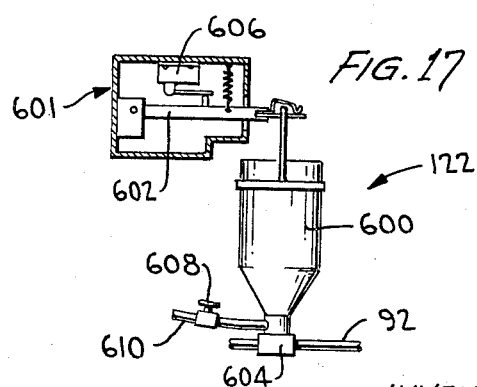

United States Patent Office 3,489,145
Patented Jan. 13, 1970

3,489,145
METHOD AND APPARATUS FOR CONTINUOUS
SEPARATION OF BLOOD IN VIVO
George T. Judson, Whitney Point, N.Y., and Emil J.
Freireich, Houston, Tex., assignors to the United States
of America as represented by the Surgeon General of
the Public Health Service
Filed Aug. 8, 1966, Ser. No. 570,792
Int. Cl. A61m 5/00; A61b 5/10; B04b 11/00
U.S. Cl. 128—214                                   16 Claims

ABSTRACT OF THE DISCLOSURE

Method and apparatus for separating blood from a donor in vivo and continuousuly returning some components thereof to the donor. The blood is passed through a high speed centrifuge with a rotating seal means permitting entry of the whole blood through a stationary portion and separation of the blood in the centrifuge with the various components of the blood being returned to the stationary portion of the seal means. The plasma, white cells and red cells can be separated initially with further breakdown within these components, if desired. Various safety devices are incorporated into the system to insure that the donor is protected in the event of a breakdown and to signal the operator when any of the treating solutions such as saline, anti-coagulant and buffering material are running low. A particularly useful form of a peristaltic pump for use with the system is also disclosed.

---

This invention relates to apparatus for separating or fractionating whole blood into its various individual components and more particularly it relates to a method, means, unit and system for accomplishing separation or fractionation under the influence of centrifugal force.

In general, the present invention relates to a machine which can be linked with a human body to permit blood to continuously flow from the body, through the machine and then back to the body. During its passage through the machine, the blood is separated or fractionated into plasma, red cells, white cells and platelets, and some of these fractions are returned to the human donor while others of the fractions can selectively be collected from the machine. As such, it may be stated that the present invention relates to an "in vivo" type unit wherein blood is taken from a live donor, is passed through the machine, and is then returned to the donor.

To appreciate the nature of the present invention, as well as the difficulties and complications necessary inherent in any unit such as that described hereinafter, one must first understand the nature and character of whole blood itself. Blood is a tissue composed of a series of cells suspended in plasma. Approximately 45% of the volume of blood is formed by these cells, while the remaining 55% of the volume of blood is the plasma. Plasma essentially is the fluid part of the blood which suspends the cells and plasma itself is formed as a solution of approximately 92% water, 7% proteins and the remaining 1% of various mineral salts.

The blood cells which are suspended in the plasma include red cells, also referred to as erythrocytes, white cells also referred to as leukocytes, and platelets. The present invention not only separates the cells from their suspension in the plasma, but additionally, serves to separate the individual types of cells themselves, and for this reason, it is important to further understand the specific nature, function and properties of each of the aforementioned types of cells.

The red cells or erythrocytes are small solid particles containing the substance hemoglobin, a chemical substance having a high degree of affinity for oxygen and carbon dioxide. Accordingly, the main function of the red cells is to transport oxygen from the lungs to the body tissues and to transport carbon dioxide from the body tissues to the lungs. The red cells are created by the bone marrow of the body and virtually all of a person's red cells are within his blood stream. There are approximately 5,000,000 red cells for each cubic mm. of blood with each red cell having a specific gravity of approximately 1.1. The red cell survival or that period of time in which a red cell is able to perform its function within the body, is approximately 120 days. After this period of time, these exhausted red cells are removed from the body circulatory system and destroyed. Naturally, even while these exhausted red cells are being destroyed, new red cells are being created and introduced into the circulatory system.

Considering now the white cells or leukocytes, such cells generally serve a protective function within the blood stream, and there are, in fact, several different varieties of white cells, each of which serves a specified function. One major variety of white cells are the granulocytes, with this variety forming between 60 and 70% of the total white cells. Granulocytes are initially formed by the bone marrow and act as a defensive mechanism which counteracts the bacteria or other foreign substance. Granulocytes have a specific gravity of approximately 1.057, somewhat less than that of the red cells, and only about 5,000 granulocytes are contained in each cubic mm. of blood. The other common variety of white cells are the lymphocytes which are initially formed by the body lymph glands and which comprise about 30 to 40% of the white cells. The main function of the lymphocytes is to participate in the production of antibodies to thereby prevent the spread of infection throughout the body and to aid, to some degree, in developing immunity. There are only about 2,000 lymphocytes per cubic mm. of blood and the specific gravity of these lymphocytes is somewhere between that of the red cells and the granulocytes. There are other varieties of white cells present in very minor amount in the blood stream, such as monocytes, eosins and basophils, but these minor varieties need not be discussed in any detail herein.

Finally, platelets are small colorless bodies which act as a source of thromboplastin and thereby serve the function of aiding in the clotting of blood. Platelets are derived from megakaryocytes which are produced by the bone marrow and released therefrom into the blood stream to control hemorrhage. A platelet has a specific gravity of approximately 1.01 and there are about 200,000 platelets per cubic mm. of blood.

With the foregoing explanatory matter in mind, it becomes apparent that each of these various components of blood has its own physical and chemical properties and serves its own particular function. Accordingly, it should be appreciated that it is highly desirable to separate whole blood into these various individual fractions, for a variety of different purposes. In particular, it is desirable to produce yields of white cells for use in blood research and experimentation, immunology studies and for clinical use in organ transplants. Similarly, it is of clinical importance to produce a yield of white cells to be used as supportive therapy for cancer patients whose own white cells have been depressed by the use of anticancer drugs. Along the same line, it must be recognized that a patient suffering from leukemia has a very high white cell count and treatment of such patient often centers about removal of the excess number of white cells from the patient. Insofar as platelets are concerned, it is desirable to produce a yield of platelets to aid in study and supportive therapy with regard to the coagulation process. As to the collection of plasma, the uses of fresh and frozen plasma are well known for use in transfusion techniques. Finally, with respect to red cells, it is desirable to produce pure red cell yields for use in transfusing fresh packed red cells and for preservation by freezing.

There are certain known techniques and types of equipment for separating or fractionating whole blood directed to an "in vitro" type of operation wherein a quantity of blood is processed after the same has been removed completely from a donor's circulatory system. In such known "in vitro" techniques and procedures, such as plasmapheresis and leukapheresis, the yield of white blood cells is, at best, very low, and moreover, such existing techniques and procedures are extremely complicated, laborious and time consuming. Thus, until the present time and the development of the present invention, there has been no practical and rapid method for removing white blood cells from a quantity of whole blood. Similarly, there has been a need for an efficient and safe equipment, technique or other means for a continuous flow in vivo type of blood separation.

Perhaps the need for the present invention can best be understood by considering the commonest form of in vivo blood transfer, namely, a blood transfusion from a donor to a recipient. Virtually all of the donor's red cells or erythrocytes are in his blood stream and can thus be readily transfused to the recipient. About 90% to 100% of the transfused red cells will remain in circulation in the recipient. Also, as previously indicated, the red cell survival is about 120 days, and thus, if the recipient only requires additional red cells, he need only receive transfusion at widely spaced intervals. Furthermore, short term preservation techniques for red cells have been perfected and such red cells can thus be stored for up to three weeks and still remain effective.

On the other hand, when platelets are transfused from a donor to a recipient, only approximately 33% and often less thereof, remain in circulation in the recipient. Also, platelet survival is one to three days, and accordingly, transfusion must be given quite frequently. Finally, there is no known preservation technique for platelets, so only freshly drawn platelets can be used. Thus, it can be seen that platelet transfusion is considerably more difficult and expensive than red cell transfusion, but it is at least possible.

However, considering white cell or leukocyte transfusion, until the advent of the present invention, there was no known convenient and efficient means for accomplishing this type of transfusion. This will be more clearly understood when it is recognized that less than 20% of the donor's white cells are contained within his circulating blood stream. The remainder, somewhat near 80% of the white cells, are contained within the bone marrow or lymph nodes. Thus, in any event, a transfusion of whole blood from a donor to a recipient is a rather poor source of white cell supply. Accordingly, in the transfusion of whole blood from a normal donor to a recipient, there is no measurable increase whatsover in the recipient's white cell count. In fact, tests have shown that to obtain any appreciable increase in a recipient's white cell count would require more than twice the number of white cells contained in the normal donor's entire blood volume. Also, white cell survival is very short and thus even if it were possible to provide the recipient with a transfusion having an adequate number of white cells therein, such as a transfusion from a donor suffering from chronic myelocytic leukemia, the survival time of the transfused white cells would be very short, and a further transfusion would then be needed.

As a final point with respect to transfusion from a donor to a recipient, it is generally known that a donor who has whole blood removed from his circulatory system can donate only one unit or 500 cc. of blood every sixty days. This is primarily because the red blood cells, which have a very long life span, are normally replaced at a very slow rate. Therefore, if a person donates whole blood more frequently than every sixty days, he may develop anemia or low concentration of red cells in his blood. However, if whole blood is removed from the donor and the red cells alone are returned to the donor, such donor can donate one liter of plasma, the equivalent of four 500 cc. units of blood, every week. In other words, the person can donate plasma more than thirty times as frequently as he can donate whole blood. This results because the platelets and the plasma proteins, the liquid portion of the blood, are replaced by the donor's body much more frequently than are the red cells. Since the body replaces white blood cells most rapidly, the present invention provides a valuable unit since it separates the white cells from whole blood and returns the red cells, plasma, and, if desired, platelets, to the donor, thereby greatly increasing the permissible frequency of white cells donations.

Before development of the present invention, it was believed that the problems in creating an "in vivo" type of blood separator were virtually insurmountable. It must be remembered that in a separator of this type, the donor's blood is continuously flowing out of his body, is being separated, then recombined, and finally returned to his body. Naturally, any damage to the blood during transit through the separating apparatus could result in serious injury or even death to the patient. Therefore, a great variety of safety factors had to be considered in developing the present invention as a practical, safe and reliable piece of equipment.

Foremost among the problems encountered in developing the present apparatus, was a consideration of what would occur if the machine power suddenly failed. The present invention had to be designed in such a manner that even if such power failure did occur, the same would not be injurious to the donor and the donor would not lose too great a quantity of his blood.

Another problem was the consideration of the tendency of blood to clot, and for this reason, provision had to be made for continually admixing anti-coagulant with the blood to assure that the same would flow readily through the separating apparatus. Also, in this regard, a sensing mechanism had to be provided to assure that the supply of anti-coagulant will not inadvertently become exhausted, thereby permitting the blood to clot. Of course, another serious problem in any apparatus of this type is that of sanitation, and the present invention had to be particularly concerned with the fact that no impurities contacted the blood during its travel through the separation apparatus. To accomplish the desired degree of sanitation, the present invention was designed with no air-blood interface, so that the blood would contact only clean sterile surfaces.

Other problems in the development of an apparatus of this type had to be concerned with the possibility of undue temperature rise in the blood during its travel through the apparatus, as, for example, due to the heat of friction created at bearing seals and the like. Along a similar line, since the blood was to be out of the patient's body for some time during its transit through the apparatus, such blood had to be restored to proper temperature before being returned to the patient's body. Also, means had to be provided to sense if any vein occlusion occurred, thereby interrupting the flow of blood from the patient to the apparatus, and simultaneously, causing damage to the donor and the vein. Another problem which had to be considered was the problem of hemolysis of the red cells during their travel through the machine. It was feared that the passage of the red cells through pumps and through a centrifuge apparatus would damage the red cells, and this was one of the considerations which had to be taken into account in design of the apparatus. Finally, there was the problem of leakage of air into the blood as the same was outside the donor's body, thereby creating potentially fatal bubbles in the blood stream.

With the foregoing matters in mind, it is, therefore, the principal object of the present invention to provide a continuous flow blood separator which can be linked with a live patient to accomplish a continuous in vivo separation of human blood.

Another principal object of the present invention is to provide a method and means for separating whole blood into its major fractional components as such whole blood is being continuously supplied from a live patient.

Another principal object of the present invention is to capitalize on the differences in specific gravity between the major components of whole blood by using such differences in specific gravity to effect a separation of the components into individual fractions.

Another principal object of the present invention is to provide a method, means, unit and system capable of drawing whole blood from a live patient, dividing such whole blood into its major fractional components, removing selected fractional components from the remainder thereof and thereafter recombining the remaining fractional components and returning the same to the patient's circulatory system, all of the foregoing being carried out on a continuous flow basis.

Another object of the present invention is to provide a practical equipment means which can process whole blood on an in vivo basis with a minimum amount of effort and transportation of the blood being encountered during such processing.

Other objects of the present invention include the provision of an instrument wherein: (a) leukocytes are separated from whole blood at a reasonable efficiency by sedimentation in a centrifuge; (b) operation is conducted on a continuous flow basis to allow processing of large quantities of blood at optimal speed and efficiency; (c) a vein-to-vein procedure is used to avoid arterial puncture; (d) an anti-coagulant that doesn't require anti-coagulation of the donor, and risks associated therewith, is employed; (e) the loss of platelets, red cells and plasma is minimal to allow processing of large volumes of blood in a single donor; (f) a completely closed needle-to-needle system is used, without any air-blood interface, to obviate the danger of air injection or bacterial contamination; (g) the entire system contains a volume of blood less than 500 ml. at all times; and (h) the system can be easily cleaned, mostly disposable, and sufficiently automated to be operated by a single nonprofessional operator.

Further objects of the present invention include the provision of a method and means for accomplishing continuous in vivo separation of whole blood, which method and means: (a) efficiently separates whole blood into its major fractional components, namely, red cells, white cells, platelets and plasma; (b) enables any selected major fraction or fractions of the separated blood to be collected wihle the remaining fractions can be returned to the donor's circulatory system; (c) produces high yields of white cells and platelets which were heretofore only obtainable in small quantities; (d) includes a variety of safety factors to ensure that neither the patient nor his blood will be harmed in any way, even if machine failure were to occur; (e) operates in an efficient, economic manner to enable whole blood to be continuously processed; and (f) provides the first known practical means for processing blood on an in vivo basis, as opposed to the cumbersome and time consuming techniques previously utilized.

Still further objects of the present invention include the provision of a continuous flow blood separator which: (a) automatically admixes anti-coagulant with the blood being drawn from a live donor to facilitate flow through the separator; (b) withdraws blood intermittently from the donor, thereby allowing the donor to have rest periods, but returns blood to the donor on a continuous basis; (c) collects the whole blood from the donor in a weight-sensitive receptacle means which automatically controls the commencement and termination of blood withdrawal from the donor; (d) continuously provides blood from the receptacle means to a centrifugal separator in which, due to the differences in specific gravity in the parts of the whole blood, such whole blood is separated into major fractional components; (e) permits selected fractional components of the blood to be drawn off from the centrifugal separator while the remaining fractions thereof are recombined for return to the donor's body; (f) automatically backfeeds a portion of the blood returning to the donor's body from the centrifugal separator during the time periods when no blood is being withdrawn from the donor's body, to thereby prevent any undesired clotting at the donor needle; (g) automatically senses any vein occlusion and in the event that such does occur, automatically stops blood withdrawal to prevent any damage to the patient or his vein; (h) automatically collects any air bubbles from the recombined blood stream returning to the patient's body; and, if desired (i) re-heats the returning blood stream until the same is at proper body temperature, thereby eliminating any possibility of trauma or shock to the donor when the blood re-enters his body.

Still another object of the present invention is the provision of a continuous flow blood separator having a variety of safety devices included therein to prevent any damage to the patient and/or his blood, such safety devices including the provision of: (a) highly sterile transfer tubing which maintains full sanitary conditions while contacting the blood; (b) gradually increasing the donor flow rates to minimize the occurrence of an occluded vein; (c) minimized transportation of the blood to decrease the time that the blood is outside the donor's body; (d) minimized volume of the apparatus to assure that only a small volume of the patient's blood will be outside his body in the event that the machine should shut down due to power failure; (e) means for sensing vein occlusion and for automatically terminating withdrawal of blood from the donor's body, should the same occur; (f) level sensing means to assure that the intravenous saline solutions and the anti-coagulant solution do not inadvertently drop below a specified safe level; (g) specialized seal arrangements within the machine to minimize the amount of temperature rise due to heat of friction and the like, and to prevent hemolysis and the ingestion of air into the system; (h) an automatic diverting arrangement to prevent the blood from inadvertently clotting before the same is mixed with anti-coagulant; (i) means for detecting and collecting any bubble which might have formed in the blood before the same is returned to the donor's body; (j) means for re-heating the blood to the proper level before the same is re-introduced into the donor's body; (k) an automatic saline prime diverting arrangement to prevent priming solution from being returned to the donor's body, except when so desired; and (l) visual and audible signal means on the apparatus to immediately indicate any unsafe condition to the operator.

Other objects, advantages and salient features of the present invention will become apparent from the following detailed description, which, taken in conjunction with the annexed drawings, discloses a preferred embodiment thereof.

The foregoing objects are generally attained by providing an apparatus or system of the type to be described in detail hereinafter, which apparatus or system is linked with a donor by needles inserted into the donor's limbs, as, for example, an output needle inserted into one of the donor's arms and a return needle inserted into the other of the donor's arms. Initially, the system is primed with a saline solution to purge any air therefrom, and after such priming has been effected, an arm cuff is inflated by the machine on the donor's arm carrying the output or supply needle. Simultaneously with expansion of the arm cuff, a first pump is energized to initiate withdrawal of blood from the patient's arm, and also simultaneously, a second pump is energized to supply anti-coagulant which is mixed with the donor's blood. This anti-coagulated blood is then supplied to a receptacle means, also known as a buffer bag, and the same becomes gradually filled with anti-coagulated blood. Once this buffer bag has been filled, a sensing device automatically shuts off the blood and anti-coagulant pumps and deflates the arm cuff, thereby temporarily terminating withdrawal of the blood from the donor's arm and permitting the donor to rest.

The anti-coagulated blood from the buffer bag is then continuously fed to a centrifugal separator which operates to separate or fractionate the blood into its major fractional components, namely, red cells, white cells, platelets and plasma. A separate output port is provided for each of these fractional components, except the white cell port is used to collect platelets, and a separate pump is linked with each of these ports, whereupon when a selected pump is energized at a specified rate, the same will draw a selected fraction of blood through its associated port and will pull the withdrawn fraction through the pump at the specified rate.

The red cells exit from the centrifugal separator and pass through return tubing to the return needle located in a vein in the donor's other arm. A waste divert arrangement is provided in the return tubing to selectively exhaust certain products, such as the primary solution, rather than letting such products return to the donor. A bubble detector is provided in the return line to detect and collect any bubbles which might inadvertently have been caused in the red cell stream. Also, a heater is provided for bringing the returned red cells back to normal body blood temperature. The plasma can be recombined with the red cells in advance of the bubble detector and return heater, and can be returned to the donor's body with the red cells. Alternatively, the plasma may be passed to a needle rinse arrangement which feeds the plasma back to a short length of tubing between the output needle and the junction where the anti-coagulant is mixed with the blood coming from the donor's body. This plasma return will prevent any undesired clotting within the short length of tubing. As an ancillary feature, the plasma, which usually is rich with platelets when "G" forces are low, may be passed through a second stage centrifuge which can separate the platelets from the plasma to permit ultimate collection of the platelets themselves. Alternatively, concentrated platelets can be collected at higher "G" forces directly through the white cell port.

When the level of anti-coagulated blood in the buffer bag drops to a preselected level, a sensing mechanism automatically re-inflates the arm cuff and energizes the blood and anti-coagulant pumps to once again start withdrawal of blood from the donor. Such withdrawal will again continue until the buffer bag is filled, at which time, the arm cuff will again be deflated and the blood and anti-coagulant pumps will again be stopped. The withdrawal from the donor is thus intermittent, but the feed from the buffer bag to the centrifugal separator is constant, and likewise, the return flow of blood to the donor is constant.

Referring now to the drawings:

FIGURE 2 is a top plan view of a separator machine embodying the system of the present invention;

FIGURE 3 is a front elevational view of the machine of FIGURE 2;

FIGURE 5 is a sectional view of the novel centrifuge means of the present invention;

FIGURE 7 is a top plan view of a rotating seal used in the centrifuge means of the present invention;

FIGURE 8 is a sectional view taken along line 8—8 of FIGURE 7;

FIGURE 9 is a side elevational view of a stationary seal used in the centrifuge means of the present invention;

FIGURE 10 is a bottom plan view of the stationary seal of FIGURE 9;

FIGURE 11 is a sectional view taken along line 11—11 of FIGURE 10;

FIGURE 12 is a top plan view of a typical pump means used in the present invention;

FIGURE 13 is a fragmentary sectional view of the pump means of FIGURE 12;

FIGURE 14 is a perspective view of one type of pump drive means used in the present invention;

FIGURE 15 is a perspective view of another type of pump drive means used in the present invention;

FIGURE 16 is a side elevational view of a typical valve means used in the present invention;

FIGURE 17 is a sectional view of the novel bubble detector used in the present invention; and FIGURE 18 is a front elevational view of the novel control panel and warning light assembly used in the present invention.

Figure 1:
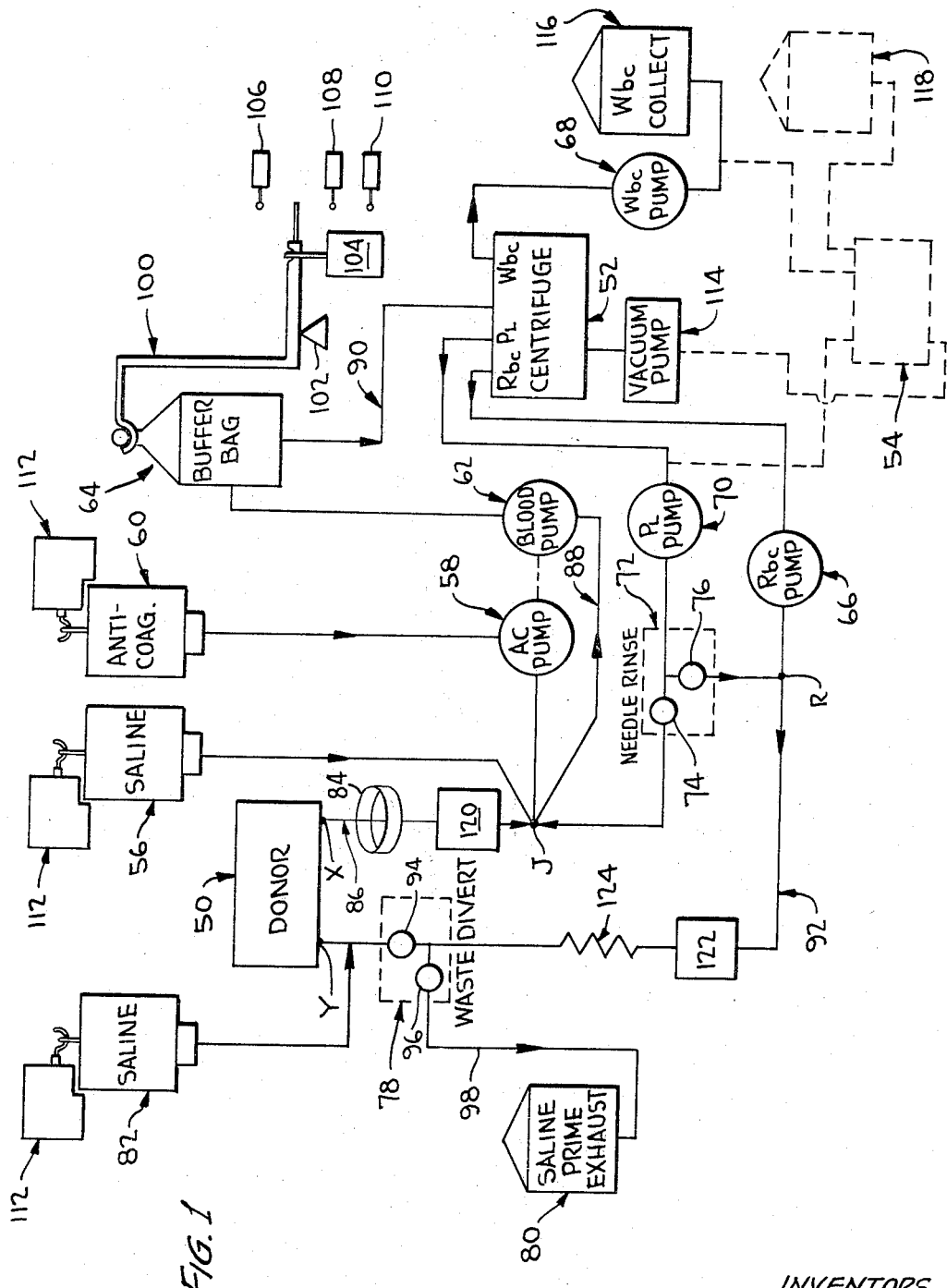
FIGURE 1 is a schematic view of the system of the present invention.

Referring now to FIGURE 1, which represents a simplified schematic diagram of the overall system of the present invention, it will be seen that a donor or patient generally designated 50 is linked through a series of lines and components with a centrifuge generally designated 52. The entire objective of the present invention is to supply whole blood from the donor 50 to the centrifuge 52 wherein separation will occur due to differences in rates of sedimentation and density, within a centrifugal field. Thus, the centrifuge 52 separates the whole blood from the patient 50 into red cells or erythrocytes, white cells or leukocytes, platelets and plasma. The platelets are drawn out of the centrifuge 52 either with the white cells or with the plasma in the form of platelet-rich plasma. Certain of these blood fractions, such as the white cells, can be separately collected from the centrifuge 52, while the remaining fractions leave the centrifuge 52, are recombined and are thereafter returned to the donor 50. Thus, the centrifuge 52 effectively is coupled with and acts as a portion of the donor's own circulatory system. It may be thus stated that the present invention relates to an in vivo system having continuous flow characteristics. The term "continuous flow" will be understood to be applicable in the present invention even though blood is only intermittently withdrawn from the donor 50, but is continuously returned to him. This continuous flow in vivo type of operation should be recognized as wholly distinct from prior art in vitro techniques and prior in vivo techniques such as the Conn Fractionator, wherein a quantity of blood was entirely withdrawn from a donor's' body and separated from the remainder of his circulatory system, and was thereafter separated or otherwise processed apart from the donor himself.

While the centrifuge 52 acts as the main fractionating or separating mechanism of the subject invention, a second centrifuge 54, as shown in dotted lines in FIGURE 1, may likewise be provided to enable the system to be used in two stage procedures wherein further subdivision or concentration of a particular blood fraction may be required.

In describing the system of the present invention hereinafter, it will be understood that the tubing, centrifuge bowls and centrifuge face seals may be provided as disposable items which can be discarded after each use of the system. In this manner, the problems of sterilization are greatly diminished.

Electrocardiogram apparatus is installed near the donor 50 to enable the operator to periodically monitor the donor's heart condition and to observe the effects of anti-coagulant on the action of the heart muscle. Appropriate venipunctures are made in the donor's limbs, and in the most usual instance, an output needle is linked with one of the donor's arms and a return needle is linked with the other of his arms. The output point is designated X in FIGURE 1, while the return point is designated Y in FIGURE 1. Before the donor is actually linked with the system of the present invention to initiate separation of his blood, it is first necessary to prime the system in order to purge any air therefrom. Such priming is effectuated through use of an isotonic saline priming solution, supplied by a source generally designated 56 in FIGURE 1. To understand the nature of the priming operation, it will first be necessary to generally describe the other major components of the system of the present invention. The major components include five separate pumps which provide the force within the system to convey whole blood, red cells, white cells, plasma and anti-coagulant through the various lengths of tubing interconnecting the donor 50 with the centrifuge 52. More specifically, these pumps include an anti-coagulant pump generally designated 58 and normally coupled with a supply of anti-coagulant generally designated 60, a whole blood pump generally designated 62 linked between the donor and a receptacle means or reservoir generally designated 64, such reservoir also being referred to as a buffer bag. Additionally, the system includes a red cell pump generally designated 66, a white cell pump generally designated 68 and a plasma pump generally designated 70, all of these latter pumps being connected to outputs of the centrifuge 52.

To initiate the priming operation, the centrifuge 52 is started at slow speed and the anti-coagulant pump 58 and blood pump 62 are energized, the latter being set to draw the saline 56 into the system at a rate of about 100 milliliters per minute. As this saline priming solution enters the buffer bag 64, the same will start to fill and when this bag is between ⅓ and ½ full, the output pumps 66, 68 and 70 are each started to draw an output at the rate of 25 to 30 milliliters per minute. Thus, the saline priming solution will transfer from the buffer bag 64 into the centrifuge 52 and since the priming fluid has a higher specific gravity than the air, the same will displace any air within the centrifuge. That is, the priming fluid will collect on the outermost portion of the centrifuge walls thereby forcing any air inwardly toward the center of the centrifuge. The operator conducting the priming of the system visually observes the output from the centrifuge to the various output pumps. When he observes saline in the line leading to the white cell pump 68, this pump is turned off. When the saline in the line leading to and past the red cell pump 66 reaches the point designated R, where the plasma ordinarily recombines with the red cells, the operator then turns off the red cell pump 66.

The priming solution exiting from the centrifuge through the plasma line passes the plasma pump 70 and is supplied to a needle rinse mechanism generally designated 72, which will be described in further detail hereinafter. This mechanism 72 includes a pair of oppositely acting valves 74 and 76. That is, when the valve 74 is open, the valve 76 is closed, and vice versa. As the priming is being carried out, the mechanism 72 is set for a needle rinse, thus meaning that the valve 74 is opened and the valve 76 is closed. The saline priming solution will thus flow through the valve 74 and upwardly, as indicated by the arrows, toward the output side X of the donor 50. This operation purges the air from the donor line. When such purging has been completed, the needle rinse mechanism 72 is shut off, thereby opening the valve 76 and closing the valve 74. The priming solution will then pass through the valve 76 to the re-combination point R and will continue through the return line toward the return side Y of the donor. The priming solution finally reaches the return point Y of the donor, and when this occurs, the return line will have been completely purged of air. At this time, the priming solution can be diverted through a waste divert assembly generally designated 78 to an exhaust means generally designated 80.

At this time, the entire system will be filled with priming solution and all air will be purged therefrom. Accordingly, the donor 50 can then be linked with the system to enable whole blood to enter the system. Because the whole blood has a higher specific gravity than that of the priming fluid, the whole blood introduced into the system will serve to displace the priming fluid, just as the priming fluid itself served to displace any air previously within the system.

As the system is set into normal operation, an intravenous saline supply 82, linked with the return line, is turned on at a slow drip. An inflatable arm cuff means generally designated 84, surrounds the donor's arm near the output point X. A short length of tubing generally designated 86 extends from the output point X to a junction J where the anti-coagulant from the supply 60 is admixed with the whole blood flowing from the donor. The centrifuge 52 is gradually brought up to operating speed, the arm cuff means 84 is expanded, and the anti-coagulant pump 58 and blood pump 60 are started into slow operation. The pumps 58 and 62 are geared together for synchronous operation, and as these two pumps operate, blood is drawn from the donor's arm through the length of tubing 86 to mix with the anti-coagulant coming from the supply 60 thereof, such mixing taking place at the juncture point J. The gearing arrangement between the pumps 58 and 62, is such that a predetermined volume ratio of blood to anti-coagulant is maintained, for example, a 7:1 ratio. The anti-coagulated blood then flows from the juncture J through a line 88 and to the buffer bag 64. The speed of the blood pump 62 is slow at first to prevent occlusion of the donor vein, but this pump gradually increases in speed up to a maximum flow rate of 100 milliliters per minute. The volume of the buffer bag means 64 is about 150 milliliters and the volume of the centrifuge 52 is about 125 milliliters. All of the various other components, tubing, and other parts of the system accommodate about 140 milliliters, so that even when the system is entirely filled with blood, the total quantity of blood outside the donor's body is only about 415 milliliters. The average 150 lb. person has about 6,000 milliliters within his circulatory system while the average 200 lb. person has about 7,600 milliliters within his circulatory system, so it can be seen that the total quantity of blood outside the donor's circulatory system at any one time is rather small. The system of the present invention is purposely designed in this manner, so that in the event of any power failure, the donor 50 will not lose any more blood than is normally given during a conventional blood transfusion.

Level control means to be described in further detail hereinafter, are associated with the buffer bag 64 to sense when the same is filled and to further sense when the level therewithin drops to a specified point. Once the anti-coagulated blood flowing through the line 88 fills the buffer bag to a predetermined level, the system automatically deflates the arm cuff means 84 and stops the pumps 58 and 62. This allows the donor 50 to rest while the anti-coagulated blood from the buffer bag 64 drains into the centrifuge 52. However, once the pumps 58 and 62 have stopped, there is a danger that the blood within the tubing 86, between the output point X and the junction J, will clot, due to the fact that no anti-coagulant is mixed therein. To prevent clotting from occurring within this length of tubing 86, the needle rinse mechanism 72 is operated to open the valve 74 so that priming fluid will pass therethrough and up to and past the junction J. This priming fluid is used during the initial operation of the machine to prevent clotting within the tubing 86; however, after the machine has been in operation for a few minutes, all of the priming fluid has been exhausted from the system and the donor's own plasma is utilized for subsequent needle rinse operation.

When the buffer bag 64 is initially filled with anti-coagulated blood, the operator must make sure that the pumps 66 and 70 are turned on. Naturally, the plasma pump 70 has to be utilized to accomplish the needle rinse operation described immediately hereinabove. The anticoagulated blood from the buffer bag drains by gravity through a line generally designated 90 to the centrifuge 52. The whole blood enters the centrifuge 52 through a seal means and the action of the output pumps 66 and 70 causes this blood to move into a centrifugal field set up by the rotating centrifuge. The centrifugal forces within the separator cause the whole blood to climb along the walls of the centrifuge and to simultaneously separate into fractions based mainly upon differences in specific gravities of the various componential portions of the whole blood. The fraction having the heaviest specific gravity is the red cells or erythrocytes and this fraction is the one contained on the outermost wall of the centrifuge 52. The next heaviest and hence next inwardly displaced fraction is the white cells or leukocytes, then comes the platelets and finally the innermost or lightest layer is the plasma. The top cover of the centrifuge 52 is fabricated of transparent material so that the whole blood separation within the centrifuge 52 can be visually observed. Such a visual observation of the separation would show the outermost red cell fraction to be of a dark red color, the center or middle white cell and/or platelet fraction to be of a pinkish or white color, commonly called the buffy coat, and the innermost plasma fraction to be of a yellowish color.

The saline previously contained in the centrifuge 52 is moved out ahead of the blood being separated and is diverted to the waste divert mechanism 78. Separate output ports are provided in the centrifuge 52, one for the red cells, one for the white cells and one for the plasma. The platelets can be drawn out either through the white cell ports or the plasma port. As the centrifuge is initially filling, the red cells are allowed to accumulate along the outer wall thereof by turning off the red cell pump 66, but the plasma pump 70 remains in operation so that the plasma is continuously drawn out from the centrifuge 52. When the interface between the red cell and the plasma reaches the white cell port, the red cell pump 66 is turned on and the pumps 66 and 68 are adjusted relative to one another to maintain such interface in alignment with the white cell port. The return rate of the red cells and plasma to the donor is about 50 milliliters per minute. Assuming that no needle rinse is occurring, the plasma will combine with the red cells at the recombination point R and such recombined plasma and red cells will then traverse the return line generally designated 92 toward the waste divert assembly 78.

The waste divert assembly 78 includes a pair of oppositely acting valves 94 and 96. That is, the valve 94 is open when the valve 96 is closed, and vice versa. When the saline priming fluid is being exhausted from the system, the valve 94 is closed and the valve 96 is opened, thereby diverting the saline priming fluid through a line 98 to the exhaust means 80. However, once the priming fluid has been completely exhausted from the system, the valve 96 is closed and the valve 94 is opened. Thereafter, the recombined plasma and red cells traversing the return line 92 will pass through the valve 94 and continue toward the donor's body.

The recombined flow of plasma and red cells then reenters the donor's body at the return point Y, and at this time, the intravenous drip from the saline supply 82 may be turned off.

Control of the amount of any one fraction being withdrawn from the centrifuge 52 may be accomplished by varying the settings of the output pumps 66, 68 and 70. Thus, if one wanted to increase the amount of plasma in the centrifuge, the speed of the plasma pump 70 would be slowed down while the speed of the red cell pump 66 would be increased. Conversely, if one wanted to increase the amount of red cells in the centrifuge, the speed of the red cell pump 66 would be slowed down and the speed of the plasma pump 70 would be increased. Thus, by properly regulating and correlating the speeds of the pumps 66 and 70, the relative radial location of the interface between the plasma and the red cells can be controlled.

Insofar as the white cells are concerned, the volume of white cells in normal blood is only about 1% of the total. Accordingly, the white cell layer or buffy coat within the centrifuge builds up slowly and does not even become noticeable for sometime. Therefore, when the donor 50 has normal blood, the white cells from the centrifuge 52 are drawn out only at intervals, such drawing out occurring by operation of the white cell pump 68. On the other hand, if the donor 50 has a high white cell count, such as he would have if he were suffering from chronic lymphocytic leukemia, the volume of white cells within the blood would be considerably higher and the same could be drawn out continuously at a slow rate of 2 to 4 milliliters per minute.

It will be recalled that the buffer bag 64 was initially filled with anti-coagulated blood, and when this blood reached the high level within the buffer bag, a sensing mechanism automatically deflated the arm cuff 84 and terminated operation of the pumps 58 and 62. Thereafter, the blood from the buffer bag drained continuously by gravity through the line 90 to the centrifuge 52. This drainage of the blood from the buffer bag eventually operates a first low level signal device which serves to re-inflate the arm cuff 84, to start the pumps 58 and 62, and to terminate the operation of the needle rinse mechanism 72. As the pumps 58 and 62 again start to operate, blood will again be drawn from the donor 50 and transferred to the buffer bag 64, and the foregoing cycle will start again. From this time on, operation of the system will be completely automatic except in the event that the operator switches the red cell-plasma pumps into complementary mode. Such mode adjusts the relative red cell-plasma flow rates to keep the interface therebetween at a constant radial position within the centrifuge, such position being just before the white cell port. Once the buffer bag is again filled to high level, the pumps 58 and 62 will stop, the arm cuff 84 will deflate, and the machine will again go into needle rinse. It can thus be seen that donations from the donor 50 into the system are intermittent, in units of approximately 150 milliliters each. This is done to permit the donor to rest and to minimize the length of time that the cuff 84 is inflated. On the other hand, the return flow rate to the donor is about 50 milliliters per minute and is maintained constant.

As was previously mentioned, a sensing mechanism is associated with the buffer bag 64 to determine when the same reaches a predetermined high or low level. To further understand this sensing mechanism, it will be seen from FIGURE 1 that the buffer bag 64 is supported from one end of a beam balance arm means generally designated 100, such beam balance arm means being supported upon a pivot point 102. A suitable weight in the form of a brass block 104 is supported from the opposite end of the beam balance arm to serve as a counterbalance against the weight of the buffer bag. Giving due consideration to the weight of the beam balance arm itself, it will be appreciated that variations in the amount of fluid within the buffer bag 64 will cause the beam balance arm to pivot, in one direction or the other, about the pivot point 102.

Three different sensing means are associated with the beam balance arm 100 for causing various machine operations in response to different buffer bag weights. The first of these sensing mechanisms is a microswitch 106 which acts as the buffer bag high limit switch and which is actuated when the weight of the buffer bag plus the fluid contained therein is approximately 280 grams. Actuating of the switch 106 stops the blood or input pump 62 and simultaneously initiates a needle rinse cycle. This needle rinse cycle continues until the next lower microswitch, designated 108 and generally called the refill buffer switch, is actuated. As the fluid flows out of the buffer bag through the line 90 to the centrifuge 52, the weight of the buffer bag gradually decreases, and when this weight drops to about 60 grams, the switch 108 is actuated. Actuation of the switch 108 turns off the needle rinse cycle and starts the input or blood pump 62 and its coupled anti-coagulant pump 58. Since it takes about 12 seconds for the input pump 62 to accelerate to its normal speed, and since the output pumps 66, 68 and 70 are operating, there must be a sufficient quantity of fluid remaining in the buffer bag to supply these output pumps so that the buffer bag will not become completely depleted before the new anti-coagulated blood supply is furnished thereto. Actuation of the switch 108 also sounds an audible chime device to indicate to the donor and the operator that blood is again being pumped from the donor's body. Finally, the lowest ef the switch devices is a microswitch generally designated 110, which is called the buffer low switch. This switch is actuated when the level of the fluid within the buffer bag 64 drops to such a degree that the weight of the buffer bag and fluid is only 30 grams. This condition could occur if the input or blood pump 62 is accelerating at too low a rate for the flow rate of the output pumps. When the switch 110 is actuated, the same acts as a safety device to automatically stop the output pumps 66, 68 and 70 until the quantity of anti-coagulated blood in the buffer bag has had a chance to build up to a proper level. When this occurs, the output pumps are again started automatically. Actuation of the switch 110 will also cause a buzzer to sound and a low limit light to flash on and off, such flashing and buzzing continuing until a safe fluid level is reached within the buffer bag.

To give a further understanding of the system as shown in FIGURE 1, it will be seen that level sensing means 112 are associated with each of the IV or intravenous bottles. Specifically, these bottles are the priming saline source 56, the anti-coagulant source 60 and the intravenous saline drip source 82. Each of the sensing means 112 uses microswitches to perform two functions, namely, a warning function and a stop function. The warning function serves to indicate that a particular IV bottle is running low and that a fresh bottle should be used to replace the same. Since these bottles drain very slowly, there is ample time for the operator to replace a partially empty bottle with a new or fresh bottle. The IV bottle warning signal will operate only when the buffer bag beam balance arm is in a high limit condition since, at this time, the buffer bag is full and the anti-coagulant pump 58 and blood pump 62 are turned off. This condition will be sensed when the weight of an IV bottle is 120 milliliters, plus or minus 20%, and at this time, a buzzer will sound continuously until the low IV bottle is replaced by a new bottle. Also, a flashing light on the console will indicate that the IV bottle is low. However, in the event that the warning buzzer and the IV bottle low light are ignored, then eventually one IV bottle supply will become depleted, and when this occurs, the sensor 112 must perform the stop function. This stop function is reached when the quantity of fluid remaining in an IV bottle is 60 milliliters, plus or minus 20%. At this minimum level, a further switch in the sensor unit 112 will transmit a signal to the buffer high limit switch 106, thereby stopping the anti-coagulant pump 58 and blood pump 62 and simultaneously initiating a needle rinse cycle. The warning buzzer and IV bottle low light still continue to operate to indicate the condition to the operator. If the operator should push the reset switch, this will momentarily start the input pump 62 operating, but immediately upon release of such switch, this pump will again stop. In any event, operation of the reset switch does not silence the buzzer or stop the indicating light from flashing. It will be understood and appreciated that if this condition continues for any length of time, the quantity of fluid in the buffer bag will gradually lower and the buffer bag beam balance arm will attempt to actuate the buffer refill switch 108. However, the sensor switch 112 will override this refill switch and will prevent the blood pump 62 from being started to refill the buffer bag. Finally, the buffer bag will reach its low level at which time the switch 110 will be operated to stop the output pumps. At this time, all of the machine pumps and hence all blood flow will be stopped but the audible and visible signal means will continue to operate to indicate the dangerous condition of the machine. Of course, the prime reason for arranging the system so that the IV stop function overrides the refill function, is to prevent the machine from operating if the supply of anti-coagulant 60 becomes exhausted. The donor's blood cannot be run through the machine without first being anti-coagulated since this would create a condition wherein the blood would readily clot.

To complete the description of the schematic diagram shown in FIGURE 1, it will be seen that a vacuum pump means 114 is coupled to the casing of the centrifuges 52 and 54. This vacuum pump means serves to drain any fluid spill-over into the centrifuge casings.

Insofar as the output from the centrifuge 52 is concerned, it will be seen that the red cells pass through the line 92 and are returned to the donor 50. The plasma passes through the needle rinse assembly 72 and is either used to perform a needle rinse function, or alternatively, is recombined with the red cells for a return to the donor. The white cells pumped from the centrifuge 52 go to a collection means generally designated 116.

Insofar as the second centrifuge 54 is concerned, it was previously mentioned that this centrifuge could be used to further refine a particular fraction of blood from the centrifuge 52. For instance, the platelets may be removed from the centrifuge 52 along with the plasma in the form of platelet-rich plasma. If it was desired to separate the platelets from the plasma, the same could be passed through the second centrifuge 54 with the platelets being supplied to a collection means 118 and the plasma being returned to the line flowing to the needle rinse assembly. Alternatively, if the platelets were removed with the white cells, such a combination fraction could again be passed through the second stage centrifuge 54 to separate the platelets from the white cells. Finally, it is possible to use the second stage centrifuge 54 to process other components. For example, it can be used to remove cryogenic proteins previously precipitated by chilling the plasma as it passes from the first stage centrifuge to the second stage centrifuge.

Finally, associated with the output tubing 86, there is an occluded vein sensor generally designated 120, which can be of any suitable type for sensing collapse of a vein. In the return line or tubing 92, there is a bubble detector unit generally designated 122, and a return heater generally designated 124, each of which will also be described further hereinafter.

Figure 4:
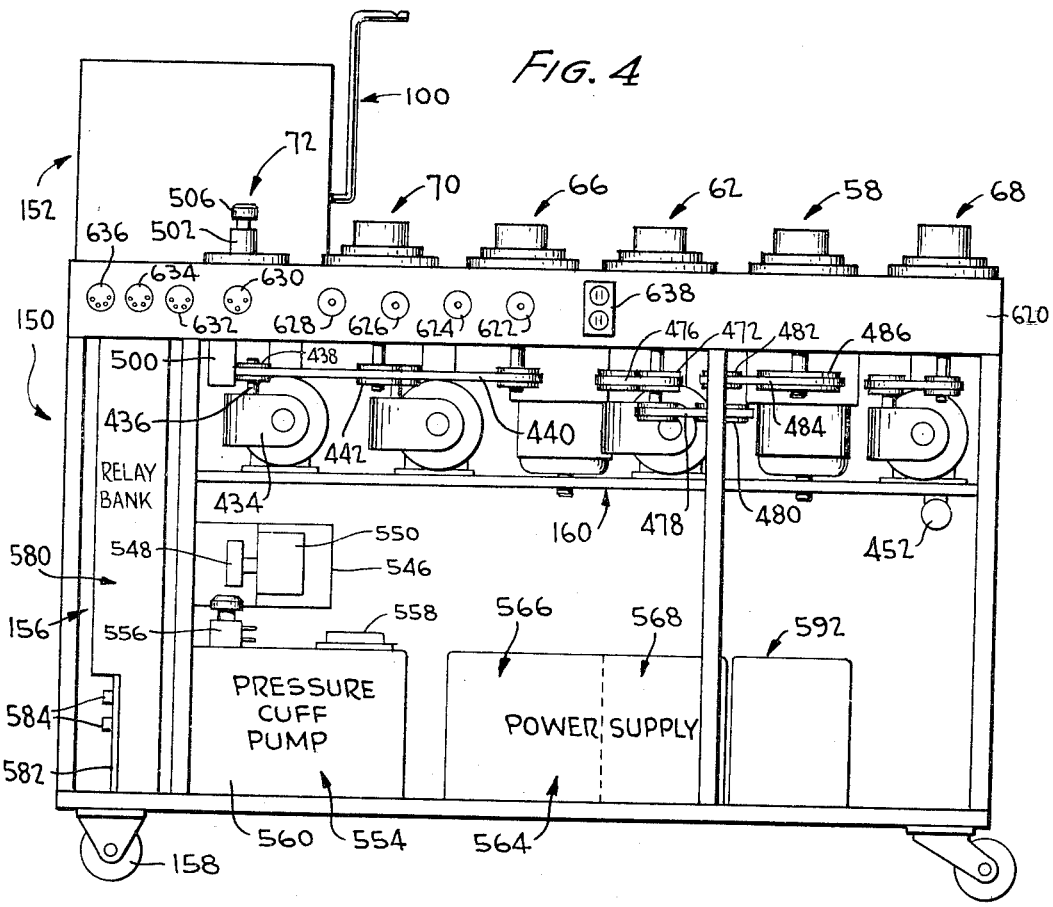
FIGURE 4 is a rear elevational view of the machine of FIGURE 2.

Considering now the more detailed aspects of the present invention, FIGURES 2, 3 and 4, respectively, illustrate top, front and rear elevational views of the in vivo blood separator machine, the same being generally 150. A control console generally designated 152 is mounted on the top or upper surface 154 of the machine, and the details of this console will be described more fully hereinafter. The machine includes a main framework, generally designated 156, which is supported on wheels or casters 158 to enable ready transport of the machine. A bottom mounting plate extends across the bottom of the frame means 156 for mounting some of the components of the machine 150, others of such components being supported by the upper or top surface 154 or by an intermediate supporting plate member 160. An examination of FIGURES 2, 3 and 4 will show the general location of the centrifuge means 52, and 54, of the various pump means, of the waste divert assembly, and the needle rinse assembly, and of the various driving or operating means for each of these portions of the machine. The details of such driving means will be described further hereinafter.

To understand the specific nature of the centrifuge assembly 52, attention is directed to FIGURE 5 wherein the details of the same are shown. The centrifuge includes a casing 162 mounted beneath an opening in the top 154 of the machine. Such casing includes an enlarged central bottom hole or aperture 164 for receiving a driving plate 166 mounted on a shaft 168 of a 110 volt direct current shunt wound drive motor 170. The casing 162 also includes at least one drain hole 172 radially displaced from the central aperture 164, with the purpose of the drain hole being to couple the interior of the casing 162 with the vacuum pump means 114. As such, the vacuum pump will serve to draw off any fluid spill-over interiorly of the casing. A drive belt 174 extends between the motor drive shaft 168 and a motor tachometer generator unit 176. A motor control unit senses any back EMF generated by the armature of the centrifuge drive motor 170 and compares the same with the setting of the motor speed control potentiometer. Any speed variation of the drive motor 170 caused by an increase or decrease in the load thereupon will cause a corresponding increase or decrease in back EMF which will be sensed and corrected for by the control unit.

The centrifuge also includes a bowl or shell generally designated 178 which is disposed within the casing 162. The shell 178 has an upstanding cylindrical side wall means 180 which terminates in an outwardly directed flange 182. The bottom wall 184 of the shell is provided with an alternating rib and groove assembly 186, which cooperates with a similar assembly 188 on the driving plate 166. In this manner, operation of the drive motor 170 will impart a rotation to the driving plate 166, and this rotation will in turn be imparted to the centrifuge shell 178 to rotate the same. Rotational speeds of the centrifuge range from 0 to 2500 r.p.m., plus or minus 10%. Rotational speeds within this range will cause gravitation forces from 0 to 560 G, plus or minus 20%, at the outermost separation surfaces.

The interior of the side walls 180 of the centrifuge shell 178 serve to provide the outer boundary for the separation channel. Starting at the top of the centrifuge shell, a wall portion 190 extends linearly downwardly for a predetermined distance, then merges smoothly into an inwardly and downwardly inclined wall portion 192 which in turn merges into another linearly extending wall portion 194. This wall portion 194 extends downwardly until the same intersects the inner surface 196 of the bottom wall 184.

Another portion of the centrifuge assembly 52 is the center or filler piece generally designated 200. This filler piece is suitably suspended from the top cover of the centrifuge assembly, in a manner which will be described hereinafter. A central bore 202 extends completely from the upper surface of the filler piece to the bottom surface 204 thereof. This bore 202 provides the input channel to the centrifuge. The filler piece itself is cylindrically shaped and of a somewhat smaller diameter than that of the shell wall portion 194. As such, the outer or side wall 206 of the filler piece is spaced slightly away from the wall portion 194 to thereby provide the other boundary of the separation channel. This channel itself is designated 208 and extends with uniform thickness substantially for the height of the shell wall portion 194. Substantially opposite to the inclined portion 192 of the centrifuge shell, the side wall 206 of the filler piece is radially curved, as shown at 210. This curve merges into an inwardly extending shoulder portion 212 which again turns into an upwardly extending portion at 214 to blend into the top surface 216.

Figure 6:
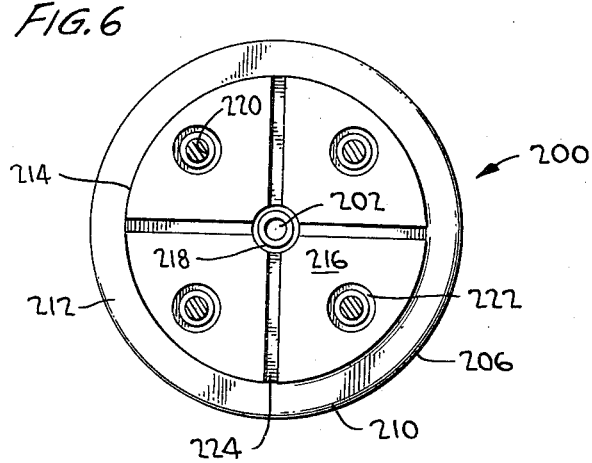
FIGURE 6 is a top plan view of the filler piece used in the centrifuge means of the present invention.

By referring to FIGURE 6, as well as FIGURE 5, it will be seen that a central recess is provided in the top wall 216 of the filler piece 200, and an O-ring 218 of substantially rectangular cross-sectional configuration is disposed within a groove about the periphery of this recess portion. Four equally spaced tapped holes 220 are provided in the upper surfaces 216 of the filler piece for the purpose of receiving screws which couple the filler piece to the top cover of the centrifuge assembly. O-rings 222 having a rectangular cross-sectional configuration similar to that of the O-ring 218 are seated within grooves surrounding each of these tapped holes 220. Radially extending channels or passages 224 are provided at 90 degree intervals along the top surface 216 of the filler piece, with each of these channels extending between the wall surface 214 and the side wall surface of the O-ring 218. These grooves or channels 224 serve as plasma ports as will be described more fully hereinafter.

Referring back to FIGURE 5, it will be seen that the centrifuge assembly also includes a top cover means generally designated 226, such cover means being fabricated of a clear polycarbonate plastic material which permits visual observation of the separation occurring within the centrifuge. The top cover includes a flange portion 228 which abuts against the top of the flange portion 182 of the centrifuge shell. A sealing O-ring 230 is interposed between the two flange portions to prevent any leakage. Also, aligned apertures are formed through the flanges 182 and 228 to permit reception of a nut and bolt fastening means 232 which couples the cover to the shell. A short vertical wall portion 234 extends downwardly from the top cover to mate contiguously with the wall portion 190 of the centrifuge shell, thereby properly positioning the cover on the shell. At the end of the vertical wall portion 234, there is a horizontal or radially inwardly stepped portion 236 which merges with the top of another short vertical wall portion 238. At the bottom of the wall portion 238, there is another radially inwardly stepped portion 240 which merges with the top of a further vertical wall portion 242. The bottom of this vertical wall portion 242 merges with the bottom surface 244 of the top cover. This surface 244 rests upon the top surface 216 of the filler piece 200. A small central boss 246 depends beneath the bottom wall 244 to rest in the recess formed in the central top of the filler piece.

Four holes 248 are formed through the top cover means 226, witth such holes being spaced 90 degrees from one another. Thus, these holes 248 align with the holes 220 formed in the top of the filler piece. Screws 250 extend through the holes 248 and into the holes 220 to thereby securely attach the filler piece to the cover. As can be seen from FIGURE 5, when the filler piece is attached in this manner, the bottom surface 204 thereof is spaced slightly away from the bottom inner surface 196 of the centrifuge shell. Hence, a small space is provided so that the whole blood flowing into the centrifuge through the bore 202 can spread outwardly to the separation channel 208 and can then climb upwardly therealong as the centrifuge is operated.

A seal means generally designated 252 forms the upper part of the centrifuge means 52, as can be seen in FIGURE 5. Such seal means includes a lower rotating seal means generally designated 254 and an upper stationary seal means generally designated 256. The lower or rotating seal means 254 fits within a first stepped recess 258 on the top of the top cover means 226. A second stepped recess 260 is also provided in the top cover means, with the stepped portion 260 being somewhat smaller than the stepped portion 258. A central bore 262 extends completely through the top cover means at the center thereof, with such bore extending from the stepped portion 260 to the bottom projection 246. As can be seen, the bore 262 in the top cover is coaxial with the central bore 202 of the filler piece 200.

The stepped portion 260 in the top cover contains a plurality of spaced grooves concentrically arranged about the central bore 262 thereof. An O-ring having a rectangular cross-sectional configuration is mounted within each of these grooves. All of such O-rings can be designated 264, but it will be appreciated that the size or diameter of such O-rings continually increases. Since the bottom of the lower seal means 254 abuts against the top of the various O-rings 264, the overall effect of such an arrangement is to set off a series of channels or annular spaces between the stepped portions 260 and the bottom of the seal means 254. The smaller or innermost O-ring 264 defines therewithin a circular opening designated 266, with such opening being axially aligned with the central bore 262. Between this innermost O-ring and the next adjacent O-ring, a first annular channel 268 is formed. Between the second O-ring and the next adjacent O-ring, a second annular channel 270 is formed. Finally, between said next adjacent O-ring and the outermost O-ring, a third or outer annular channel 272 is formed. Each of the annular channels 268, 270 and 272 serves to receive a separate fraction of the blood separated in the centrifuge means 52.

To more fully understand the nature of the separation or fractionation which occurs within the centrifuge means 52, it can be seen from FIGURE 5 that the separation channel 208 having an optimum radial dimension of one millimeter, extends upwardly with uniform thickness until it reaches the inclined wall portion 192 of the centrifugal shell. At this point, the separation channel 208 merges into an enlarged separation space 274. When whole blood enters the centrifuge means 52, it travels downwardly through the central bore 202, then outwardly in the space between the bottom 204 of the filler piece and the bottom surface 196 of the shell. Then, such outwardly extending whole blood turns upwardly and climbs through the separation channel 208 to enter the space 274. Such climbing action is created by the centrifugal force generated by rotation of the centrifuge shell, filler piece and top cover. Due to this centrifugal force, the whole blood in the space 274 starts to separate due to differences in specific gravities of the various fractions theerof. The red cells are the heaviest of the fractions, and these are thus outermost within the space 274. The white cells are the next heaviest and these are thus positioned adjacent the red cells, and the plasma is the lightest and hence is disposed furthest inwardly within the centrifuge. For purposes of illustration, blood is shown in the space 274 of the centrifuge assembly in FIGURE 5, with the red cells being designated R, the white cells being designated W, and the plasma being designated P. As was previously mentioned, the quantity of white cells in the blood is extremely small, and accordingly, as separation initially starts, there is merely an interface line between the plasma P and the red cells R. As was also previously mentioned, proper regulation of the output pumps can adjust the position of this plasma-red cell interface line to space the same closer to the shell wall 190 or further away therefrom. However, after the blood has been separating for a while, the white cells W start to build up within the centrifuge to form a buffy coat of the shape generally illustrated in FIGURE 5. It will be seen that the white cell layer effectively "floats" on the red cells and plasma. Then, each of these individual fractions is transferred to its own particular annular channel in the top cover.

To transfer the red cells, a red cell port 276 extends from the wall portion 238 of the cover to the first annular channel 268. Hence, as the red cell output pump 66 is operated, providing a pull through the seal means 252 in a manner to be presently described, the red cells from the layer R are drawn through the port 276 and into the annular channel 268. The white cell port 278 extends from the portion 242 of the top cover to the annular channel 270. Thus, as the white cell output pump 68 is operated through the seal means 252, the white cells W are drawn through the port 278 to the annular channel 270. Finally, as was previously mentioned, the plasma port 224 extends through the top surface 216 of the filler piece 200. These ports communicate with bores 280 which in turn communicate with the annular channel 272. Thus, as the plasma output pump 70 is operated through the seal means 252, the plasma P is drawn through the ports 224, and the bores 280 to enter the outermost annular channel 272.

To now understand the nature and construction of the seal means 252, attention is directed to FIGURES 7 through 11 which show the individual seal means 254 and 256 in detail. The rotating seal means 254 is formed of a synthetic resin and includes a circular base portion 300 having a flat bottom surface 302. The size of the base portion 300 corresponds substantially to the size of the stepped portion 258 in the top cover 226 and when the rotating seal 254 is positioned within the top cover, the bottom surface 302 thereof abuts against the top of the O-rings 264. To prevent rotation of the seal means 254 relatively to the top cover 226, a small notch 304 is provided in the periphery of the base 300. This notch 304 mates with a guide pin 306 positioned at one edge of the stepped recess 258 in the top cover. The seal means 254 also includes an upstanding cylindrical body portion 308 integral with the base portion 300, but having a cross-sectional diameter somewhat smaller than that of the base 300. The top surface 310 of the portion 308 is divided into a series of concentrically arranged grooves and channels. At the center of the piece, a central bore goes straight through the seal means 254. Then, annular channels are concentrically arranged about the central bore 322, with such channels, in order of increasing diameter, being designated 314, 316, 318 and 320. The central bore 322 extends from the top surface 310 to the recess or opening 266, and when the seal piece 254 is properly positioned in the top cover, the bore 322 is coaxial with the bores 262 and 202. The channel 314 is of substantially the same diameter as the previously described red cell channel 268 and eight small bores 324 communicate therebetween, thereby assuring that the red cells can be transferred from the channel 268 to the channel 314. The channel 316 is of substantially the same diameter as the white cell channel 270 and communicates therewith through four equally spaced bores 326. Thus, the white cells from the channel 270 can be transferred through the bores 326 to the channel 316. The channel 318 is of substantially the same diameter as the previously described plasma channel 272 and communicates therewith through four spaced bores 328. Hence, the plasma can be transferred from the channel 272 through the bores 328 to the channel 318. The outermost channel 320 has no bores extending therefrom through the means 254, and instead, in a manner to be presently described, this outer channel 320 is filled with a saline solution to act as a barrier between air and the nearest internal blood passage.

As will be seen, there is a series of small annular lands which act as boundaries separating each of the channels 314, 316, 318 and 320. Each of these lands has a flat top defined by the top surface 310 of the seal means 254.

By referring to FIGURES 9–11, the exact nature of the upper or stationary seal means 256 can be understood. This seal means is fabricated of stainless steel and is essentially formed as a flat disc 340 having a flat lower surface 342 which is lapped to a flatness of 3 light waves or less, and a spaced parallel flat upper surface 344. The lower surface 342 rests upon the upper surface 310 of the seal means 254, which upper surface is also lapped to a flatness of 3 light waves or less. Concentrically arranged annular channels 348, 350, 352 and 354 are designed to mate respectively with the annular channels 314, 316, 318 and 320, of the seal piece 254. Hence, the channel 348 in cooperation with the channel 314 serves to define the red cell annulus. Similarly, the annular channel 350 in cooperation with the annular channel 316 serves to define the white cell annulus. Similarly, the annular channel 352 in cooperation with the annular channel 318, serves to define the plasma annulus. Finally, the annular channel 354 in cooperation with the annular channel 320, serves to define the saline seal annulus. A central bore 356 extends through the member 340 with such bore being coaxial with the bore 322 in the companion seal means. A bore 360 extends through the member 340 from the annular channel 350 to allow the white cells to be pumped out. A bore 362 extends through the member 340 from the annular channel 352 to allow the plasma to be pumped out. A bore 364 extends through the member 340 from the annular channel 354 to allow saline to be pumped in.

Each of the various bores extending through the member 340 terminates at the upper surface 344 in communication with small tube means generally designated 372. These tubes, in turn, are coupled with the tubing harness to receive the plastic tubing from the machine.

In use, with the stationary seal means 256 juxtaposed to the rotating seal means 254, saline is pumped inwardly through the port 364. In the outermost annulus, this saline acts as a seal to prevent any air from working its way inwardly and also acts as a barrier between air and the nearest blood passage. A pair of small holes 374 are provided on opposite sides of the top surface 344 of the stationary seal means 256. The purpose of these holes 374 is to receive guide pins which maintain the seal piece in a stationary, non-rotating manner, while at the same time, applying adequate downward pressure thereto. By referring back to FIGURES 2 and 3, it will be seen that an arm means 380 overlies each of the centrifuge means 52 and 54. The outermost end of the arm means is pivotally mounted at 382 to permit the arm 380 to be raised and lowered. Two small guide pins 384 depend from the inner end of the arm 380 where the same overlies the centrifuge means, with these pins 384 fitting into the holes 374 in the stationary seal means 256. A screw knob 386 is removably threaded upon a stud, not shown, which extends upwardly from the top 154 of the machine and through a slot in each arm 380. Thus, when the threaded knob 386 is removed, the arm 380 can be swung upwardly to permit the centrifuge assembly to be removed from or introduced into its casing 162. Once the entire centrifuge assembly has been properly positioned within its casing, the arm 380 is swung downwardly and the positioning pins 384 are located in the guide holes 374. Then, the threaded knob 386 is applied to its mounting stud and is tightened down, thereby causing the arm to apply a pressure against the seal means, such pressure being effective to maintain proper contact at the seal means 252.

With the foregoing explanation in mind, it might be well to summarize the operation of the centrifuge means 52. Assuming that all of the parts are properly positioned, as shown in FIGURE 5, and further assuming that the machine tubing harness is coupled to the tubes 372, and that the arm 380 is properly tightened down, the drive motor 170 can be set into operation to cause a rotation of the centrifuge, and the whole blood can then be introduced thereinto from the buffer bag. Such whole blood enters through the central bore 356 in the stationary seal means, traverses the aligned central bore 322 in the rotating seal means, then traverses the central bore 262 in the top cover, and finally traverses the central bore 202 in the filler piece. The whole blood then spreads out along the bottom of the centrifuge and climbs along the walls thereof through the separation channel 208, finally entering the space 274. As separation is occurring within the centrifuge, saline is being pumped into the grooves and the outermost channel of the seal means. Operation of the red cell pump 66 will cause the red cells R from the space 274 to be withdrawn through the port 276, into the channel 268, through the bores 324, into the annular channels 314 and 348, through the outlet port 358 and its associated tubing and eventually through the pump. Similarly, operation of the white cell pump 68 will cause the white cells W from the space 274 in the centrifuge to be withdrawn through the white cell port 278, into the annular channel 270, then through the bores 326 in the rotating seal, into the annular channels 316 and 350 between the seals, then through the outlet port 360 in the stationary seal, through its associated tube 372, and finally through the white cell pump itself. Finally, operation of the plasma pump 70 will cause the plasma P from the space 274 to be withdrawn through the plasma ports 224, then through the bores 280 in the top cover and into the annular channel 272, thereafter traveling through the ports 328 in the lower or rotating seal into the annular channels 318 and 352 between the seals, then through the outlet port 362 in the stationary seal, through its associated tube 372 and finally through the plasma pump itself. Variations in the speed at which the pumps 66, 68 and 70 are driven will naturally vary the rates at which the separate fractions are withdrawn from the centrifuge.

Considering now the various pumps utilized in the machine 150, attention is directed to FIGURES 12 and 13, wherein a typical pump is illustrated. All of the five pumps in the machine 150 are of the peristaltic type having a rotating portion which progressively occludes the plastic tubing passing through the pump. The input or blood pump 62 is illustrated in FIGURE 12 merely as a typical pump construction. All of the other pumps except the white cell pump 68 are similar to the pump shown in FIGURE 12. The pump includes an upstanding outer casing or sleeve designated 400, such sleeve having a circular inner race 402. An inlet opening 404 and an outlet opening 406 are spaced apart along the sleeve 400 to permit the plastic tubing carrying the blood or other fluid to be pumped to be inserted within the pump. Insertion of such tubing within the pump is facilitated by the construction of the pump cap generally designated 408, and as can best be seen in FIGURE 2. This pump cap 408 includes a flange having a small groove 410 therein and the tubing to be introduced into the pump is placed within such groove 410. Then, as the cap 408 is rotated, either automatically or manually, the tubing is effectively "threaded" into the interior of the pump to follow the contour of the race 402, except for that small portion thereof between the openings 404 and 406.

The pump is operated by a pump motor and drive means of a type to be presently described, and operation of such motor and drive means serves to rotate a driving disc 412 located within the sleeve 400, as can be seen in FIGURES 12 and 13. A pair of rollers 414 are rotatably mounted on the top of such disc 412, with the rollers being spaced 180 degrees apart. The periphery of the rollers 414 extends slightly beyond the edge of the driving disc 412 but is spaced away from the inner race 402 of the pump by a distance substantially equal to twice the wall thickness of the tubing to be passed through the pump. Thus, as the driving disc 412 rotates, it causes a simultaneous rotation of the rollers 414, with these rollers serving to collapse or occlude the plastic tubing between the outer periphery of the rollers and the sleeve race 402. The progressive rotation of the rollers 414 serves to progressively occlude the tubing, thereby conveying or advancing any fluid contained therewithin.

In order to properly position the tubing within the pump housing or sleeve 400, tubing guide means are provided. Such guide means includes a flat plastic butterfly disc 416 which rests upon the driving plate 412 and extends therebeyond substantially to the inner race 402. A top or overlying butterfly plate 418 is provided with a peripheral notch 420, as shown in FIGURE 13, within which the tubing, designated T in FIGURE 13, can be positioned. A pair of spaced holes 422 extend through the guide pieces 416, 418 and terminate in aligned threaded holes in the driving plate 412. Similarly, spaced holes are provided in the cap 408 and thus through the use of a pair of elongated screws, the cap 408 and the tubing guide means 416 and 418 can be coupled to the driving plate 412 for simultaneous rotation therewith.

To understand the manner in which the various pumps of the present invention are driven, attention is directed to FIGURES 14 and 15 hereof. The driving motors for the pumps of the present invention are 110 volt direct current shunt wound gear head motors. Each of the output pumps 66, 68 and 70 is driven by its own individual motor, and the drive means for these output pumps is shown in FIGURE 14. On the other hand, a single motor drives both the anti-coagulant pump 58 and the whole blood input pump 62, and this driving arrangement is shown in FIGURE 15.

Referring to FIGURE 14, the output pump drive arrangement includes an electric driving motor 430 having an outboard shaft 432 at one end thereof and a coupled gear head or gear drive arrangement 434 at the opposite end thereof. The gear head, when operated by the drive motor 430, serves to rotate an upstanding shaft 436 which in turn, mounts a drive pulley 438. The drive pulley 438 operates a driving belt 440 which is coupled to another pulley 442 on the depending shaft 444 of an electric clutch mechanism 446. When the machine power is on, the electric clutch 446 is energized to prevent the pumps from being manually operated. The electric clutch mechanism 446, in turn, is coupled by a shaft coupling means 448, to the driving disc 412 of any of the output pumps. For purposes of illustration, the plasma pump 70 has been illustrated in FIGURE 14.

At the forward end of the drive motor 430, an elongated bracket 450 is provided, such bracket serving to support a tachgenerator 452 having a forwardly extending shaft 454. A first drive pulley 456 is mounted on the motor shaft 432 and a superposed pulley 458 is mounted on the tachgenerator shaft 454. A driving belt 460 extends between these pulleys whereupon operation of the drive motor 430 causes a simultaneous operation of the tachgenerator 452. For the red cell and plasma pumps, the bracket 450 is in upstanding relationship, as shown in FIGURE 14. However, for the white cell pump, the bracket 450 depends downwardly and the tachgenerator 452 is mounted beneath the drive motor 430, as shown in FIGURE 3.

The various tachgenerators 452 are utilized to convert the r.p.m. of the drive motor 430 into a related output on the unit console 152. Each tachgenerator 452 is a permanent magnet generator which delivers 3.8 volts for each 100 revolutions per minute of the drive motor 430. The output of each individual tachgenerator is fed to a meter calibration circuit which consists of a voltage dropping resistor and a calibration potentiometer to match the output of the tachgenerator at a given speed to the dial calibration of an individual meter on the console 152.

Referring now to FIGURE 15, which shows the drive arrangement for the anti-coagulant pump 58 and the blood pump 62, it will be seen that the drive motor, its attached gear head, the bracket and the tachgenerator are all identical to that just described in connection with FIGURE 14. However, on the gear drive shaft 436, an enlarged driving pulley 470 is provided, and on the depending shaft 444 from the clutch mechanism 446 for the whole blood pump 62, a small upper pulley 472 and a small lower pulley 474 are provided. A driving belt 476 couples the pulley 470 with the uppermost pulley 472. Another driving belt 478 extends from the lowermost pulley 474 to an enlarged idler pulley 480. The idler pulley 480 carries a connected smaller pulley 482 which is connected by a driving belt 484 to an enlarged pulley 486 on the shaft 444 from the clutch mechanism for the anti-coagulant pump 58. The purpose of this type of drive arrangement becomes apparent when it is remembered that the driving motor shown in FIGURE 15 operates both the whole blood pump 62 and the anti-coagulant pump 58, but that the anti-coagulant pump is to operate at only a fraction of the speed of the whole blood pump. When using the anti-coagulant solution commonly used in the machine, namely ACD, an acid-citrate-dextrose solution, the ratio of the whole blood to anti-coagulant is 7:1. This 7:1 reduction in the speed of the blood pump is accomplished through the use of the idler pulley 480 which reduces the speed of the blood pump shaft by a factor of 7. This reduced speed is then transmitted to the anti-coagulant pump shaft.

All of the driving mechanisms for the pumps is located on the mounting plate 160 within the machine, as can best be seen from FIGURES 3 and 4. To complete the description of the various pumps and their driving means, the motor 430 driving the blood pump 62 also drives a cam which strikes a microswitch for every 0.7 revolutions of the input pump. This generates an impulse which initiates advance in the total milliliter input counter on the console 152. Each count on the counter represents an inflow of one milliliter. An acceleration control device to be described presently controls the operation of the whole blood pump 62. This pump always starts at zero revolutions per minute and gradually builds up to a preselected speed. The speed of the input pump varies between 0 and 255 milliliters per minute, plus or minus 10%. The red cell, plasma and white cell pumps all operate between 0 and 100 milliliters per minute, plus or minus 10%. The plastic tubing utilized in all of the pumps has a basic size of 0.25 inch outside diameter and 0.125 inch inside diameter. However, provision is made to substitute various diameters of rollers 414 to permit the optional use of tubing of various diameters and wall thicknesses.

As was previously described, the needle rinse assembly 72 includes a pair of valves 74 and 76. Similarly, the waste divert assembly includes a pair of valves 94 and 96. For an understanding of the construction of such valves, attention is directed to FIGURE 16 wherein a typical valve is illustrated. All of the valves used in the machine 150 are of the solenoid type, that is, electrically operated valves including a solenoid core designated 500. The core carries a projection 502 having an aperture extending centrally therethrough, through which the solenoid core or plunger 504 passes. A head 506 is provided on the end of the solenoid plunger and as the plunger is drawn into the core, the bottom of the head 506 abuts against the top of the projection 502. The projection 502 includes an elongated slot 508 communicating with the bore through which the plunger 504 passes. A first pin 510 is attached to the projection 502 at one end of the slot 508. A second pin 512 is attached to the plunger 504 and extends through the slot 508 in parallel relation with the fixed pin 510. The plastic tubing utilized in the machine 150 passes between the pins 510 and 512, and when the valve is in closed position, as shown in solid lines in FIGURE 16, the pins 510 and 512 serve to pinch closed the tubing passing therebetween, thereby preventing flow through such tubing. On the other hand, when the valve is moved to opened position, as shown in dotted lines in FIGURE 16, the movable pin 512 is moved to the opposite end of the slot 508 and the tubing is therefore not collapsed or pinched. Accordingly, flow through such tubing can be accomplished.

In practice, one of the valves of each assembly is normally opened while the other valve thereof is normally closed. For example, in the needle rinse assembly 72, the valve 74 is normally closed and the valve 76 is normally opened. Similarly, in the waste divert assembly 78, the valve 94 is normally opened and the valve 96 is normally closed. However, when the machine goes into a needle rinse cycle, the positions of the valves in the assembly 72 are reversed, and at that time, the valve 74 is opened and the valve 76 is closed. Similarly, if the machine goes into a waste divert cycle, the valve 96 is opened and the valve 94 is closed.

Continuing with the description of the machine 150, attention is directed to FIGURE 3, wherein the vacuum pump means 114 can be seen mounted on the bottom of the machine frame 156. Two vacuum pumps are provided, with one being attached to the centrifuge casing bore 172 of the centrifuge means 52, and the other being attached to the same casing bore for the centrifuge means 54. Each vacuum pump consists of a hysteresis disc motor 540 which drives a miniature suction pump 542. These motors are under control of the main machine power switch and thus run continuously as soon as the power to the machine is turned on.

Also mounted on the bottom of the machine frame 156, as can be seen in FIGURES 3 and 4, is an acceleration control device generally designated 546. This device is intended to control the acceleration of the input or blood pump 62. The acceleration control device 546 includes a four r.p.m. two-phase synchronous reversible motor 548, a powerstat unit 550, an associated power transfer relay and associated limit switches. The powerstat is mechanically connected to the motor and controls the amount of 115 volt AC power being supplied to the input pump variable control on the control panel or console 152. When the buffer bag drains to a point where the refill buffer switch 108 is actuated, a signal will be transmitted to the motor 548 thereby causing the same to drive the powerstat in a forward direction which increases the voltage to the input pump variable control. The length of time needed to increase the powerstat 550 from 0 volt to 115 volts AC, as applied to the variable control means on the console 152, is about 12 seconds. At the expiration of this 12 second time, the power transfer relay of the device 546 transfers the full 115 volts AC to the control panel input pump variable control.

As was also mentioned, the acceleration control device 546 includes a forward and a rearward limit switch actuatable by the motor 548. When the motor actuates the forward limit switch, the direction of driving is reversed and thus, the motor returns the powerstat 550 to a zero volt output to be ready to start the next cycle for drawing blood from the patient. This reverse driving of the powerstat will end when the motor actuates the reverse limit switch. Thus, while it will be appreciated that the maximum speed of the input or blood pump 62 is controlled by the variable pump control on the control panel or console 152, the time period required for the blood pump 62 to reach this preselected speed is governed by the acceleration control device 546. In other words, regardless of the setting on the console, it will require about 12 seconds for the pump to accelerate to its preset speed. This type of control is important to prevent the occurrence of a vein occlusion which might otherwise occur if the pump instantaneously went into operation and withdrew a high flow rate from the donor's vein, and also is important to prevent any hemolysis or trauma damage to the red cells.

Referring again to the inflatable cuff 84, the same need not be illustrated in detail herein since it merely corresponds to the conventional form of inflatable arm cuff, such as is commonly used in connection with sphygmomanometers. However, instead of being manually inflated and deflated, as is the conventional arm cuff, the arm cuff 84 of the present invention is actuated by a cuff pump assembly generally designated 554 and carried on the bottom of the machine frame 156, as shown in FIGURE 4. The cuff pump assembly 554 includes a solenoid pinch valve means 556, of the type previously described, a pressure switch 558 and a combined pump and motor 560. The cuff pump automatically inflates the arm cuff 84 around the patient's donating arm to a pressure between 40 to 60 millimeters of mercury. The solenoid valve 556 is normally opened, however, when the buffer bag drains to a point where the refill buffer switch 108 is actuated, then the valve 556 will close on an air exhaust tube leading from the motor and pump 560. This will cause the motor to operate a piston within a pressure chamber, thereby acting as a pump to provide pressurized air to the arm cuff 84. This air will begin to inflate the arm cuff and will continue to do so until the pressure switch 558 senses the preselected pressure of between 40 to 60 millimeters of mercury. At such time, the switch 558 cuts off power to the motor, but if the pressure at the cuff drops below the preselected range, the pressure switch 558 will again start the motor 560 to maintain proper pressure at the cuff. The cuff will remain inflated until the buffer bag is filled, thereby reaching its high limit and actuating the switch 106. When this switch is actuated, the valve 556 is de-energized, thereby opening the same to allow any pressurized air from the motor to vent off or exhaust. Simultaneously, power to the motor 560 is interrupted. Except as described herein, the arm cuff is not normally inflated and therefore, arm cuff inflation is only intermittent for periods of time sufficient to refill the buffer bag 64. Provision is made for manual inflation of the cuff during preparation of the machine for use. The purpose of only intermittently inflating the cuff 84 when the donor is attached, is to provide the maximum degree of comfort for the donor 50.

The power supply for the machine 150 is carried at the bottom of the frame 156 and is generally designated 564. Such power supply includes a 48 volt DC power supply generally designated 566 and a 110 volt DC power supply generally designated 568. The 48 volt power supply 566 is a ferro-resonant transformer supply which is utilized to supply power to all of the relays, signal lights, sensing units and chime on the machine. Taps are provided on the secondary side of the power transformer to allow the output voltage to be adjusted to a nominal 48 volts. The 110 volt power supply 568 is used to supply power to the pump motor fields, the solenoid valves and the electric friction clutch mechanisms. This power supply is unregulated and line voltage variations will cause proportional variations in the output voltage. Therefore, the power supply 568 includes a variable auto-transformer, which permits adjustment to the output voltage of 110 volts so long as the line voltage is within plus or minus 10% of 115 volts AC. The power supply 568 also includes a meter for reading the value of the power supply output voltage.

Referring again to FIGURES 3 and 4, there is shown therein at one end of the machine frame 156, beneath the console 152, a relay gate means generally designated 580. This relay gate means includes 28 separate 48 volt DC dual relays for accomplishing logic control function. Also, it includes one 48 volt DC power transfer relay which is utilized in connection with the acceleration control unit 546. Additionally, the relay gate includes a fuse panel 582 having six fuses 584 mounted therein to assure electrical safety of the machine circuit. Finally, the relay gate means 580 includes a pair of 115 volt AC timing motor assemblies generally designated 586, such assemblies providing timing pulses for the indicating lights, the buzzer and the auxiliary needle rinse cycle. Each of the timing units 586 includes a small synchronous timing motor which drives a circuit breaker unit for timing pulses and a cam segment to provide a longer time interval than is provided by the circuit breaker unit. The timing motors are under the control of the main power switch drive 590 of the machine, such switch being mounted on the front of the machine at the upper right hand corner thereof, just beneath the console 152. When the main power switch 590 is turned on, the timing motors 586 are energized and will thereafter run continuously so long as the machine is turned on. One of the timing units provides 48 volt DC pulses to pulse all of the indicating lights except the power on light and the run light, and further serves to supply a timing pulse to sound the buzzer for a period of about three seconds when an occluded vein is sensed. This is the only time when the buzzer will be sounded for a preselected interval of time, and in all other circumstances, when the machine reaches a condition where the buzzer is actuated, the same will remain on until the condition is corrected. The other timing unit 586 is used to control the needle rinse cycle at the beginning of operation of the machine when the priming solution is being utilized to accomplish the needle rinse rather than the patient's own citrated plasma. This timing unit supplies a timing pulse of about three seconds when the priming fluid is supplied to the needle rinse, thereby creating a "fast rinse." After such three second period, the needle rinse cycle is stopped. It will, however, be understood that this timing cycle is not utilized when the patient's own citrated plasma is being utilized for the needle rinse operation.

The machine also includes a control box generally designated 592, such control box being located along the bottom of the machine frame 156. The control box 592 includes a series of calibration potentiometers, a buzzer device and a chime device. The buzzer is intended to operate as a warning device to call the attention of the machine operator to the fact that an unsafe condition has been sensed. Thus, the buzzer will operate when an occluded vein is sensed, at an IV bottle warn or stopped condition, at the buffer low limit condition when the switch 110 is operated, and at a bubble detect condition. Under all of these conditions, except the occluded vein, the buzzer will operate continuously until the operator has taken appropriate corrective action. As just described, in the case of an occluded vein, the timing unit 586 controls the buzzer to sound the same for a period of about three seconds.

The chime is a two-tone device which is energized when the buffer refill cycle is reached. The purpose of the chime is merely to indicate to the donor 50 that the buffer bag needs refilling and that the arm cuff is going to inflate and that the input pump will start to draw blood from the donor's vein.

Finally, the control box 592 includes a series of calibration potentiometers which can be adjusted by means of a screw driver. A calibration potentiometer is provided for each of the centrifuge assemblies 52 and 54, each of such potentiometers being a 50K, two watt current limiting device used to calibrate the centrifuge meters on the console 152. Similarly, a calibration potentiometer is provided for calibrating the white cell flow meter and for calibrating the return flow rate meter. However, in the case of the calibration potentiometer for the return flow rate meter, the driving source is a series arrangement of the red cell and plasma tachgenerators 452.

The details of the bubble detector 122 can be seen from FIGURE 17 to include an inverted drip chamber receptacle 600 which is supported by an assembly 601 having a pivotally mounted arm 602 upon which the receptacle is hung. A fitting 604 is provided at the bottom of the receptacle 600 for receiving the return tubing 92. The receptacle 600 is normally completely filled with whole blood which communicates with the blood flowing through the return tubing 92. However, if an air bubble comes through the tubing 92, it rises into the receptacle 600 to displace a portion of the blood therein. As this portion of blood displaced from the receptacle, the weight of the receptacle is lessened. When eventually a sufficient volume of blood has been displaced from the receptacle, such volume being approximately 8 grams, the weight of the receptacle will be lightened to such a degree that the arm 602 will actuate a sensing switch 606, thereby initiating a bubble detect condition. Specifically, closure of the switch 606 sounds the warning buzzer, causes an on and off flashing of the bubble detect light on the console and stops the centrifuge output pumps 66, 68 and 70.

To correct a bubble detect condition, the receptacle 600 must be removed from the arm 602 and turned upside down, thus causing the air to rise toward the fitting 604. Then, a clamp 608 on an air bleed tube 610 is opened to permit the collected air to bleed off from the receptacle 600 through the tube 610. The receptacle 600 is thus refilled completely with blood after which it is once again inverted and attached to the arm 602. Since the weight of the filled receptacle is once again normal, the clamp 602 will move downwardly, thereby releasing the sensing switch 606. The warning indicia and the output pumps can then again be reset for normal operation.

As previously mentioned, a return heater 124 is provided along the return tubing 92, adjacent the bubble detector 122. The return heater is formed by a tank of heated water which is kept in circulation by a circulating pump. The return tubing 92 is formed into a coil portion within this tank to increase the distance and length of time required for blood flowing through the tubing to traverse the tank. The heat from the water in the tank is transferred through the tubing 92 to raise the temperature of the blood therewithin back to normal body temperature.

Referring again the FIGURE 4, the back panel of the machine 150 will be described. Such back panel is designated 620 and includes a left waste connector 622 and a left vacuum connector 624. The left waste connector 622 is attached by tubing to the waste collect means 80 associated with the left centrifuge means 54. An external tube can be attached to this connector to lead to a waste collection receptacle. The left vacuum connector 624 is attached by tubing to the vacuum pump 542 associated with the centrifuge means 54 and again external tubing should be attached to this connector to permit the waste from the centrifuge casing to be drained to a waste receptacle. In a similar manner, a right waste connector 626 and a right vacuum connector 628 are provided to cooperate with the right centrifuge means 52.

The back panel 620 also includes a three prong female electrical connector 630 for connection of the bubble detector sensor cable. Finally, the back panel includes three four prong female electrical connectors 632, 634 and 636 provided for connection of the IV bottle sensor cables for the sensing mechanism 112. These three connectors are internally wired in parallel. Thus, the connector 632 is provided for the priming saline source 56, the connector 634 for the anti-coagulant source 60 and the connector 636 for the intravenous saline source 682. A two-receptacle output 638 is also provided on the back panel 620 to permit attachment of devices such as an electrocardiogram where it is important for patient's safety that the electrical ground be the same as that of the machine itself.

Having now described the various components of the machine, attention is directed to FIGURE 18 where the control panel or console 152 is shown in greater detail. The control panel includes a front face 640 having a series of lights, switches, dials and meters thereon. Considering first the lights used on the face 640 of the control panel, there is a Power On light 642 connected across the output of the 48 volt DC power supply 566. This light indicates that AC power is being supplied to the machine, that the power supply fuse circuit is working and that there is an output from the 48 volt power supply 566.

An Occluded Vein light 644 is provided to give a flashing signal when the occluded vein sensor 120 detects occlusion of the donor's vein. Once the occluded vein situation has been corrected, the operator depresses the Push For Reset switch to restore the light 644 to its off condition.

A Bubble Detector light 646 is provided to flash on and off when the bubble detector unit 122 senses a particular volume of air in the return line 92 leading back to the donor 50. The light 646 will continue to flash until the bubble detector collecting receptacle 600 is voided of the collected air by permitting the same to escape through the release tube 610. Even if the operator pushes the Reset switch, such switch will not restore the machine to normal operation and will not turn off the light 646 unless and until the bubble detect condition has been corrected.

An IV Bottle Low light 648 is provided with three parallel inputs to the connectors 632, 634 and 636 on the back panel 620 of the machine. When the IV sensor unit 112 senses a liquid low limit by weight determination in any or all of the bottles 56, 60 and 82, the light 648 will begin to flash. This light will continue to flash on and off until a fresh bottle of the proper solution replaces the depleted bottle which initiated the signal.

A buffer Low Limit light 650 is provided to flash on and off whenever the switch 110 is actuated due to the amount of fluid in the buffer bag reaching a low limit. This light 650 will continue flashing until the blood pump 62 has increased the amount of fluid in the buffer bag 64 to a level adequate to release energization of the low limit switch 110.

System indicating lights include a small light 652 designating the prime condition of the system and a small light 654 designating a run condition of the system. The prime light 652 will flash on and off whenever the prime-run switch is in the prime position. Once priming has been completed and a patient has been coupled with the machine, the prime-run switch is turned to the run position at which time the light 654 will be steadily energized.

To now describe the switches utilized on the control panel, a Push For Waste Divert switch 656 is provided and such switch can be manually depressed at any time after the prime-run switch is moved to prime position. Once the machine is switched to such a prime position, depression of the switch 656 causes an on and off flashing of a light 658 disposed behind the switch. Since the switch is translucent, this flashing of the light can be seen by the operator. The light 658 will continue to flash until the push for reset switch is depressed. Depression of the switch 656 will also activate the solenoids of the waste divert solenoid assembly 78, thus closing the normally opened solenoid valve 94 and opening the normally closed solenoid valve 96.

A Push For Needle Rinse switch 660 is provided in conjunction with a needle rinse light 662. Depression of the switch 660 initiates a cycle of the needle rinse assembly 72 thereby causing the patient's own citrated plasma to return to the tubing section 86, thus flashing back into the patient the whole blood which was previously contained in that section of tubing. As the switch 660 is depressed, the light 662 will flash on and off, with such flashing continuing until the Push For Reset switch is actuated, or alternatively, until the refill buffer bag signal is energized. Naturally, depression of the switch 660 will also activate the solenoid valves in the needle rinse assembly to open the normally closed valve 74 and to close the normally opened valve 76. In the event that the operator pushes the button 660 at the same time that the switch 108 is energized, thereby indicating a refill buffer signal, the needle rinse will be only momentary.

A Push For Reset switch 664 is also provided on the control panel, and depression of this switch causes a restoration of the occluded vein light 644 to its off state after the occluded vein condition has been corrected, causes a restoration of the waste divert solenoids from their waste divert condition to their normal condition, and causes restoration of the needle rinse assembly to its off condition, which in turn automatically inflates the arm cuff 84 and starts the blood pump 62 into operation to pump blood to the buffer bag 64.

A prime-run switch 666 is provided for determining which mode of operation the system will assume. If the switch 666 is moved to the run position, it causes the run light 654 to be energized and makes it impossible to operate the waste divert solenoids. On the other hand, when the switch 666 is moved to the prime position, it energizes the prime light 652, permits the waste divert assembly to be controlled through the waste divert switch 656, and interrupts power to the cuff pump 560 so that the cuff 84 cannot be inflated, and finally, interrupts power to the needle rinse assembly so a needle rinse cycle cannot be initiated.

Finally, a complementary-individual switch 668 is provided to pinch or release a belt linking the controls which govern the plasma pump 70 or red cell pump 66 when the switch is in complementary mode. That is, when the switch 668 is turned to individual mode, a mechanical pincher releases the belt so that individual control of the plasma pump 70 and red cell pump 66 may be achieved, without the control of one affecting the control of the other. On the other hand, when the switch 668 is in complementary position, the mechanical pincher pinches the belt so that an increase in the speed of the plasma pump 70 causes a decrease in the speed of the red cell pump 66, and vice versa. While the switch 668 is in complementary mode, the algebraic sum of the present speeds for the red cell pump 66 and plasma pump 70 may be maintained over a small variance in pump speeds desired by the machine operator.

A spare switch 670 is also provided but the same is not electrically or mechanically connected into the machine.

Considering now the meters that are utilized on the control panel, such meters are of the 0 to 1 milliamp full scale type, with accuracy of the meters being plus or minus 2% of full scale. Each meter has its own calibration circuit consisting of a series circuit having a fixed voltage dropping resistor and a calibration potentiometer mounted in the control box 592 as previously described. The meters are driven by the tachgenerators 452 mentioned hereinabove.

A left centrifuge r.p.m. meter 676 is provided to indicate the speed and r.p.m. of the left centrifuge drive motor 170, that is, the drive motor for the centrifuge means 54. The meter face is calibrated from 0 to 250 and actual speed of the centrifuge motor is one tenth of the reading shown on the meter 676. That is, the meter actually represents motor speeds of 0 to 2500 r.p.m. although the readings are only from 0 to 250. Indications on the meter 676 are accurate within plus or minus 5% of actual motor speed.

Another meter 678 is provided for the right centrifuge means 52, with the meter 678 being identical to the meter 676.

A white blood cell meter 680 is provided to indicate in milliliters per minute the flow rate of the white cell pump 68. The meter face is calibrated from 0 to 100 milliliters per minute and meter indication is accurate within plus or minus 5% of actual pumping rates.

A return flow rate meter 682 is provided to indicate the algebraic output of the red cell pump motor and the plasma pump motor, with such indication being created by a series connection of the tachgenerators 452 for each of these motors. The return flow rate to the donor 50 is important because of the possible effects of anti-coagulant on the donor. That is, if the return flow rate were too high, it would introduce anti-coagulant into the patient's circulatory system at too fast a rate. Indication on the meter 682 should be accurate within plus or minus 5% of the actual pumping rates of the plasma and red cell pumps. When the switch 668 is turned to complementary mode, the meter will be accurate within plus or minus 10% of the actual pumping rate.

A total milliliter input meter 684 is provided to indicate the quantity of blood and anti-coagulant flowing into the system due to operation of the pumps 58 and 62. As was previously described, the shaft of the driving motor 430 associated with the blood pump 62, drives a lobed cam which actuates a switch every 0.7 revolution. Thus, every 0.7 revolution of the input pump represents an input flow of 1 milliliter into the system and a count of 1 on the meter 684. The input flow, as read by the meter 684, can be considered as the fluid flowing through the input pump 62, that is, seven parts of whole blood to one part anti-coagulant. The meter 684 is a six digit counter which can count at a rate better than five impulses per second. A mechanical reset wheel 686 is provided for the meter 684.

Finally, considering the variable controls on the control panel, a left centrifuge control generally designated 690 and a right centrifuge control generally designated 692 are provided. Each of these controls is a 6.8K linear potentiometer supplying a controlled voltage to the armature of the associated centrifuge driving motor 170. Each centrifuge control includes a transparent dial 694 having indicia 696 thereon ranging from 0 to 9. A knob 698 is provided for rotating each dial 694, and a darkened indicating section 700 is provided on the surface 640 of the control panel to permit the operator to see the exact number at which the dial is set.

The machine also includes an input pump control generally designated 702, a plasma pump control generally designated 704, a red cell pump control generally designated 706 and a white cell pump control generally designated 708. Each of these controls is a powerstat controlling the quantity of 115 volt alternating current fed to a full wave rectifier which supplies the direct current voltage to the armatures of the motors associated with each of the various pumps. Each of the controls 702, 704, 706 and 708 includes the transparent dial 694 having the indicia 696 thereon, and actuating knobs 698 and an indicating section 700 on the control face 640.

Having now described the invention in considerable detail, it will be apparent that the objects set forth at the outset of the specification have been successfully achieved. Accordingly,

What is claimed is:

1. A method of separating blood in vivo comprising the steps of:
   connecting blood withdrawal and blood return means to a donor's circulatory system;
   intermittently withdrawing a quantity of whole blood from the donor's circulatory system through said blood withdrawal means;
   combining said withdrawn whole blood with an anticoagulent to form anticoagulated blood;
   feeding said anticoagulated blood into a receptacle therefor;
   temporarily discontinuing withdrawal of whole blood from the donor's circulatory system when a predetermined high level of anticoagulated blood is contained within said receptacle;
   continuously feeding anticoagulated blood from said receptacle into a confined space;
   continuously centrifugally separating said anticoagulated blood within said confined space into individual fractional components;
   continuously withdrawing each of said individual fractional components from said confined space at a selected rate;
   continuously returning at least certain of said individual fractional components to the donor's circulatory system through said blood return means; and
   initiating a further withdrawal of whole blood from the donor's circulatory system through said blood withdrawal means whenever a predetermined low level of anticoagulated blood is contained within said receptacle;
   the blood being maintained out of contact with the atmosphere at all times while the same is removed from the donor's circulatory system.

2. A method as defined in claim 1 wherein the rate of blood withdrawal and the rate of anticoagulant supplied for said combining step are related by a predetermined ratio.

3. A method as defined in claim 1 wherein said individual fractional components include red cells, white cells and plasma and wherein said red cells are recombined with at least part of said plasma and returned to the donor's circulatory system.

4. A method as defined in claim 3 wherein said returning step includes sensing for the presence of air bubbles and removing any sensed air bubbles from said recombined red cells and plasma before the same are returned to said donor's circulatory system.

5. A method as defined in claim 3 wherein said returning step includes reheating said returning recombined red cells and plasma to substantially the temperature of the whole blood in the donor's circulatory system.

6. A method as defined in claim 1 wherein said anticoagulated blood is fed from said receptacle to said confined space by gravity.

7. A method as defined in claim 1 further including the steps of:
   surrounding a donor's limb with an inflatable cuff means;
   inflating said cuff means whenever a quantity of whole blood is being withdrawn from the donor's circulatory system; and
   deflating said cuff means whenever withdrawal of whole blood from the donor's circulatory system is temporarily discontinued.

8. In a blood processing unit for withdrawing whole blood from a donor's limb and thereafter processing the same, the improvement comprising:
   an inflatable cuff means for surrounding said donor's limb;
   cuff pump means coupled with said cuff means for inflating the same;
   said cuff pump means including pressure sensing means which terminates inflation of said cuff means when the same reaches a predetermined pressure; and
   control means for generating a control signal responsive to a sensed quantity of whole blood removed from said donor's limb;
   said control means being controllably coupled with said cuff pump means whereby said control signal is delivered from said control means to said cuff pump means;
   said cuff pump means being operative, upon receipt of a first control signal, to inflate said cuff means until said pressure sensing means senses that said predetermined pressure of inflation has been reached;
   said cuff pump means being operative, upon receipt of a second control signal, to release the pressure in said cuff means.

9. The improvement defined in claim 8 further including blood pump means for positively withdrawing said whole blood from said donor's limb, said control means being controllably coupled with said blood pump means whereupon said second control signal interrupts operation of said blood pump means.

10. The improvement defined in claim 8 wherein said control means includes a blood collecting means and a weight sensing mechanism for sensing the weight of blood within said collecting means, said first control signal being generated when said weight sensing mechanism senses that the weight of blood within said collecting means is at a low level, said second control signal being generated when said weight sensing mechanism senses that the weight of blood within said collecting means is at a high level.

11. A continuous flow blood separator for removing whole blood from a donor, separating said whole blood into fractional components and returning at least one of said fractional components to said donor, all on a continuous basis, said separator comprising:
   blood pump means;
   means for communicating between said donor and said blood pump means;
   receptacle means;
   means communicating between said blood pump means and said receptacle means;
   drive means for operating said blood pump means to convey whole blood from said donor to said receptacle means;

at least one centrifuge mounted for rotation about an axis of rotation;

said centrifuge including a confined separation space therewithin;

a seal means including a first portion coupled with said centrifuge for rotation therewith, and a second non-rotatable portion engageable with said first portion at an interface;

said seal means including an inlet passage means for admitting blood into said centrifuge;

means communicating between said receptacle means and said seal means whereby blood from said receptacle means passes through said inlet passage means to enter said confined separation space;

centrifuge drive means for rotating said centrifuge about its axis of rotation to thereby separate blood in said confined separation space into a plurality of separate fractional components;

said seal means further including a plurality of outlet passage means communicating with different portions of said confined separation space whereby separate fractional components can discharge through separate outlet passege means;

a plurality of output pumps;

means establishing communication between an outlet passage means and an output pump, with each output pump communicating with a different outlet passage means;

means communicating between one of said output pumps and said donor whereby the fractional component pumped by said one output pump can return to said donor;

a valve mechanism including first and second counteracting valves;

first connection means coupling said first valve with said means communicating between said donor and said blood pump;

second connection means coupling said second valve with said means communicating between said one output pump and said donor;

means communicating between a further output pump and said valve mechanism; and, means for selectively operating said valve mechanism to open one of said valves and to simultaneously close the other of said valves;

said valves being movable to a condition where said first valve is open and said second valve is closed, thereby transferring the fractional component from said further output pump through said first connection means to feed back to said means communicating between said donor and said blood pump;

said valves also being movable to a condition where said first valve is closed and said second valve is open, thereby transferring the fractional component from said further output pump through said second connection means to recombine with the fractional component in said means communicating between said one output pump and said donor.

12. A continuous flow blood separator as defined in claim 11 wherein said fractional components include red cells, white cells and plasma, wherein said one output pump pumps red cells and wherein said further output pump pumps plasma.

13. A continuous flow blood separator as defined in claim 11 further including a supply of anti-coagulant, an anti-coagulant pump means, and means coupling said anti-coagulant pump means with said means communicating between said donor and said blood pump means whereby said whole blood from said donor is anti-coagulated prior to passage through said blood pump means.

14. A continuous flow blood separator as defined in claim 13 wherein said blood pump means and said anti-coagulant pump means are coupled together for synchronous operation at a preselected ratio.

15. A continuous flow blood separator as defined in claim 11 wherein said receptacle means includes weight sensing means for sensing the weight of blood therewithin and for generating a signal responsive to a high level sense and a low level sense, said signal being transmitted to said blood pump means to control the operation thereof.

16. A continuous flow blood separator as defined in claim 11 further including inflatable cuff means for engagement with said donor, said cuff means being operative in synchronism with said blood pump means.

References Cited

UNITED STATES PATENTS

| | | | |
|---|---|---|---|
| 2,678,159 | 5/1954 | Ellis | 128—214 X |
| 2,705,493 | 4/1955 | Malmros et al. | 23—258.5 |
| 2,710,001 | 6/1955 | Freyburger | 128—2.05 |
| 2,835,252 | 5/1958 | Mauchel | 128—214 |
| 2,876,769 | 3/1959 | Cordova | 23—258.5 |
| 3,140,714 | 7/1964 | Murphy et al. | 128—214 |
| 3,145,713 | 8/1964 | Latham | 128—214 |
| 3,211,368 | 10/1965 | Shanley | 128—214 X |
| 3,287,721 | 11/1966 | Bache | 128—214 X |
| 3,416,664 | 12/1968 | Kumme et al. | 210—321 X |

DALTON L. TRULUCK, Primary Examiner

U.S. Cl. X.R.

128—2; 233—19